US009972962B2

(12) United States Patent
Kutz et al.

(10) Patent No.: US 9,972,962 B2
(45) Date of Patent: May 15, 2018

(54) TUNING MULTI-INPUT COMPLEX DYNAMIC SYSTEMS USING SPARSE REPRESENTATIONS OF PERFORMANCE AND EXTREMUM-SEEKING CONTROL

(71) Applicant: University of Washington, Seattle, WA (US)

(72) Inventors: Jose Nathan Kutz, Seattle, WA (US); Steven Brunton, Seattle, WA (US); Xing Fu, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 331 days.

(21) Appl. No.: 14/823,944

(22) Filed: Aug. 11, 2015

(65) Prior Publication Data
US 2016/0043526 A1    Feb. 11, 2016

Related U.S. Application Data

(60) Provisional application No. 62/035,994, filed on Aug. 11, 2014.

(51) Int. Cl.
*G06F 17/00*    (2006.01)
*G06F 19/00*    (2018.01)
(Continued)

(52) U.S. Cl.
CPC ........ *H01S 3/1115* (2013.01); *H01S 3/06791* (2013.01); *H01S 3/10069* (2013.01);
(Continued)

(58) Field of Classification Search
CPC .................................................. G05B 19/0426
USPC ......................................................... 700/90
See application file for complete search history.

(56) References Cited

U.S. PATENT DOCUMENTS 3,713,042 A * 1/1973 Kinsel ................... H01S 3/1109
372/18
5,272,708 A * 12/1993 Esterowitz ............ H01S 3/1109
372/20

(Continued)

OTHER PUBLICATIONS

Liu, X., et al., "Self-Stabilizing of a Mode-Locked Femtosecond Fiber Laser Using a Photonic Bandgap Fiber," Optics Letters 35(7):913-915, Apr. 2010.

(Continued)

*Primary Examiner* — Suresh Suryawanshi
(74) *Attorney, Agent, or Firm* — Christensen O'Connor Johnson Kindness PLLC

(57) ABSTRACT

Systems and methods for tuning multi-input complex dynamic systems in order to automatically obtain optimal performance are provided. Training is performed by measuring performance of the complex system using an objective function for a sparse sampling of input values over a variety of dynamic regimes. A sparse representation of the performance for each dynamic regime is stored in a library. At run-time, performance is measured and matched to a sparse representation in the library, and the complex system is configured with the optimal input values associated with the matching sparse representation from the library. Performance may then be optimized using an extremum-seeking controller. In some embodiments, the disclosed techniques are applied to a self-tuning mode-locked laser. In some embodiments, the disclosed techniques are applied to other complex systems such as phased array antennas and neurostimulation systems.

21 Claims, 13 Drawing Sheets

(51) Int. Cl.

| | |
|---|---|
| *H01S 3/098* | (2006.01) |
| *H01S 3/11* | (2006.01) |
| *H01S 3/067* | (2006.01) |
| *H01S 3/13* | (2006.01) |
| *H01S 3/139* | (2006.01) |
| *H01S 3/10* | (2006.01) |
| *H01S 3/00* | (2006.01) |

(52) U.S. Cl.
CPC ............ *H01S 3/1305* (2013.01); *H01S 3/139* (2013.01); *H01S 3/0014* (2013.01)

(56) References Cited

U.S. PATENT DOCUMENTS

| | | | | |
|---|---|---|---|---|
| 5,509,022 | A | | 4/1996 | Lowery |
| 5,523,543 | A | * | 6/1996 | Hunter, Jr. ............ G01J 1/4257 219/121.62 |
| 6,804,278 | B2 | * | 10/2004 | Daiber ................ H01S 5/06808 372/29.01 |
| 7,079,558 | B2 | * | 7/2006 | Xu ........................ H01S 3/1109 372/18 |
| 7,085,620 | B2 | * | 8/2006 | Maeda ................. G05B 19/404 173/188 |
| 7,570,551 | B2 | * | 8/2009 | Shoji .................... G11B 7/0945 369/44.31 |
| 8,320,774 | B2 | * | 11/2012 | Zbinden ................ H04B 10/70 398/187 |
| 8,395,762 | B2 | | 3/2013 | Hirano |
| 9,300,109 | B2 | * | 3/2016 | Knabe ....................... H01S 3/13 |
| 9,627,841 | B2 | * | 4/2017 | Boggy .................. H01S 3/0811 |
| 2005/0238068 | A1 | * | 10/2005 | Tang ................... H01S 3/09415 372/20 |
| 2015/0296604 | A1 | * | 10/2015 | Nagai .................... H05G 2/006 250/504 R |

OTHER PUBLICATIONS

Mannion, P.T., et al., "The Effect of Damage Accumulation Behaviour on Ablation Thresholds and Damage Morphology in Ultrafast Laser Micro-Machining of Common Metals in Air," Applied Surface Science 233(1-4):275-287, Jun. 2004.

Maury, R., et al., "Extremum-Seeking Control of Jet Noise," International Journal of Aeroacoustics 11(3-4):459-474, Sep. 2012.

Menyuk, C.R., "Nonlinear Pulse Propagation in Birefringent Optical Fibers," IEEE Journal of Quantum Electronics QE-23(2):174-176, Feb. 1987.

Menyuk, C.R., "Pulse Propagation in an Elliptically Birefringent Kerr Medium," IEEE Journal of Quantum Electronics 25(12):2674-2682, Dec. 1989.

Munteanu, I., et al., "Wind Turbulence Used as Searching Signal for MPPT in Variable-Speed Wind Energy Conversion Systems," Renewable Energy 34(1):322-327, Jan. 2009.

Namiki, S., et al., "Energy Rate Equations for Mode-Locked Lasers," Journal of the Optical Society of America B 14(8):2099-2111, Aug. 1997.

Needell, D., and J.A. Tropp, "CoSaMP: Iterative Signal Recovery From Incomplete and Inaccurate Samples," Communications of the ACM 53(12):93-100, Dec. 2010.

Nilsson, J., and D.N. Payne, "High-Power Fiber Lasers," Science 332(6032):921-922, May 2011.

Olshausen, B.A., and D.J. Field, "Sparse Coding of Sensory Inputs," Current Opinion in Neurobiology 14:481-487, Jul. 2004.

Ou, Y., et al., "Design and Simulation of Extremum-Seeking Open-Loop Optimal Control of Current Profile in the DIII-D Tokamak," Plasma Physics and Controlled Fusion 50(11):115001-1-115001-24, Sep. 2008.

Pastoor, M., et al., "Feedback Shear Layer Control for Bluff Body Drag Reduction," Journal of Fluid Mechanics 608:161-196, Aug. 2008.

Poole, C.D., and R.E. Wagner, "Phenomenological Approach to Polarization Dispersion in Long Single-Mode Fibers," Electronics Letters 22(19):1029-1030, Sep. 1986.

Rabinovich, M., et al., "Dynamical Encoding by Networks of Competing Neuron Groups: Winnerless Competition," Physical Review Letters 87(6):068102-1-068102-4, Aug. 2001.

Rabinovich, M.I., et al., "Transient Cognitive Dynamics, Metastability, and Decision Making," PLoS Computational Biology 4(5):e1000072, May 2008.

Radnatarov, D., et al., "Automatic Electronic-Controlled Mode Locking Self-Start in Fibre Lasers With Non-Linear Polarisation Evolution," Optics Express 21(18):20626-20631, Aug. 2013.

Ren, B., et al., "Laser Pulse Shaping via Extremum Seeking," Control Engineering Practice 20(7):674-683, Jul. 2012.

Renninger, W.H., et al., "Dissipative Solitons in Normal-Dispersion Fiber Lasers," Physical Review A 77(2):023814-1-023814-4, Feb. 2008.

Renninger, W.H., et al., "Pulse Shaping and Evolution in Normal-Dispersion Mode-Locked Fiber Lasers," IEEE Journal of Selected Topics in Quantum Electronics 18(1):389-398, Jan.-Feb. 2012.

Renninger, W.H., et al., "Self-Similar Pulse Evolution in an All-Normal-Dispersion Laser," Physical Review A 82(2):021805-1-021805-4, Aug. 2010.

Richardson, D.J., et al., "High Power Fiber Lasers: Current Status and Future Perspectives," Journal of the Optical Society of America B 27(11):B63-B92, Nov. 2010.

Set, S.Y., et al., "Laser Mode Locking Using a Saturable Absorber Incorporating Carbon Nanotubes," Journal of Lightwave Technology 22(1):51-56, Jan. 2004.

Shen, X., et al., "Electronic Control of Nonlinear-Polarization-Rotation Mode Locking in Yb-Doped Fiber Lasers," Optics Letters 37(16):3426-3428, Aug. 2012.

Shlizerman, E., et al., "Data-Driven Modeling of the Olfactory Neural Codes and Their Dynamics in the Insect Antennal Lobe," available online at http://arxiv.org/abs/1311.7450, Nov. 2013, 16 pages.

Sun, Z., et al., "Graphene Mode-Locked Ultrafast Laser," ACS Nano 4(2):803-810, Jan. 2010.

Tamura, K., and M. Nakazawa, "Optimizing Power Extraction in Stretched Pulse Fiber Ring Lasers," Applied Physics Letters 67(25):3691-3693, Dec. 1995.

Tamura, K., et al., "77-fs Pulse Generation From a Stretched-Pulse Mode-Locked All-Fiber Ring Laser," Optics Letters 18(13):1080-1082, Jul. 1993.

Toyran, S., et al., "Femtosecond Laser Photodisruption of Human Trabecular Meshwork: An In Vitro Study," Experimental Eye Research 81(3):298-305, Sep. 2005.

Tropp, J.A., "Greed is Good: Algorithmic Results for Sparse Approximation," IEEE Transactions on Information Theory 50(10):2231-2242, Oct. 2004.

Turchinovich, D., et al., "Monolithic All-PM Femtosecond Yb-Fiber Laser Stabilized With a Narrow-Band Fiber Bragg Grating and Pulse-Compressed in a Hollow-Core Photonic Crystal Fiber," Optics Express 16(18):14004-14014, Sep. 2008.

Vogel, A., and V. Venugopalan, "Mechanisms of Pulsed Laser Ablation of Biological Tissues," Chemical Reviews 103(2):577-644, Feb. 2003.

Vogel, A., et al., "Mechanisms of Femtosecond Laser Nanosurgery of Cells and Tissues," Applied Physics B 81(8):1015-1047, Dec. 2005.

Wai, P.K.A., and C. Menyuk, "Polarization Mode Dispersion, Decorrelation, and Diffusion in Optical Fibers With Randomly Varying Birefringence," Journal of Lightwave Technology 14(2):148-157, Feb. 1996.

Wang, H.-H., et al., "Experimental Application of Extremum Seeking on an Axial-Flow Compressor," IEEE Transactions on Control Systems Technology 8(2):300-309, Mar. 2000.

Wang, H.-H., et al., "Optimizing Bioreactors by Extremum Seeking," Adaptive Control and Signal Processing 13(8):651-669, Dec. 1999.

Wright, J., et al., "Robust Face Recognition via Sparse Representation," IEEE Transactions on Pattern Analysis and Machine Intelligence 31(2):210-227, Feb. 2009.

(56) References Cited

OTHER PUBLICATIONS

Xu, C., and W.W. Webb, "Measurement of Two-Photon Excitation Cross Sections of Molecular Fluorophores With Data From 690 to 1050 nm," Journal of the Optical Society of America B 13(3):481-491, Mar. 1996.

Yamashita, S., et al., "Saturable Absorbers Incorporating Carbon Nanotubes Directly Synthesized Onto Substrates and Fibers and Their Application to Mode-Locked Fiber Lasers," Optics Letters 29(14):1581-1583, Jul. 2004.

Zewail, A.H., "Femtochemistry. Past, Present, and Future," Pure and Applied Chemistry 72(12):2219-2231, Jan. 2000.

Zhang, C., and R. Ordóñez, "Numerical Optimization-Based Extremum Seeking Control With Application to ABS Design," IEEE Transactions on Automatic Control 52(3):454-467, Mar. 2007.

Zhang, H., et al., "Large Energy Soliton Erbium-Doped Fiber Laser With a Graphene-Polymer Composite Mode Locker," Applied Physics Letters 95(14):141103-1-141103-3, Oct. 2009.

Zhang, H., et al., "Large Energy Mode Locking of an Erbium-Doped Fiber Laser With Atomic Layer Graphene," Optics Express 17(20):17630-17635, Sep. 2009.

Ariyur, K.B., and M. Krstić, "Real-Time Optimization by Extremum-Seeking Control," Wiley, Hoboken, N.J., 2003, 229 pages.

Backus, S., et al., "High Power Ultrafast Lasers," Review of Scientific Instruments 69(3):1207-1223, Mar. 1998.

Bale, B.G., and S. Wabnitz, "Strong Spectral Filtering for a Mode-Locked Similariton Fiber Laser," Optics Letters 35(14):2466-2468, Jul. 2010.

Bale, B.G., et al., "Optimizing Waveguide Array Mode-Locking for High-Power Fiber Lasers," IEEE Journal of Selected Topics in Quantum Electronics 15(1):220-231, Jan.-Feb. 2009.

Bale, B.G., et al., "Transition Dynamics for Multi-Pulsing in Mode-Locked Lasers," Optics Express 17(25):23137-23146, Dec. 2009.

Baraniuk, R.G., "Compressive Sensing," IEEE Signal Processing Magazine 24(4):118-120, Jul. 2007.

Binetti, P., et al., "Formation Flight Optimization Using Extremum Seeking Feedback," Journal of Guidance, Control, and Dynamics 26(1):132-142, Jan.-Feb. 2003.

Bratcu, A.I., et al., "Maximum Power Point Tracking of Grid-Connected Photovoltaic Arrays by Using Extremum Seeking Control," Journal of Control Engineering and Applied Informatics 10(4):3-12, 2008.

Bright, I., et al., "Compressive Sensing Based Machine Learning Strategy for Characterizing the Flow Around a Cylinder With Limited Pressure Measurements," Physics of Fluids 25(12):127102, Dec. 2013.

Brunton, B.W., et al., "Optimal Sensor Placement and Enhanced Sparsity for Classification," submitted to IEEE Pattern Analysis and Machine Intelligence, available online at <http://arxiv.org/abs/1310.4217>, Oct. 2013, 13 pages.

Brunton, S.L., et al., "Compressive Sensing and Low-Rank Libraries for Classification and Reconstruction of Nonlinear Dynamical Systems," submitted to SIAM Journal of Applied Dynamical Systems, available online at <http://arxiv.org/abs/1312.4221>, Dec. 2013, 16 pages.

Brunton, S.L., et al., "Extremum-Seeking Control of a Mode-Locked Laser," IEEE Journal of Quantum Electronics 49(10):852-861, Oct. 2013.

Brunton, S.L., et al., "Maximum Power Point Tracking for Photovoltaic Optimization Using Ripple-Based Extremum Seeking Control," IEEE Transactions on Power Electronics 25(10):2531-2540, Oct. 2010.

Brunton, S.L., et al., "Self-Tuning Fiber Lasers," IEEE Journal of Selected Topics in Quantum Electronics 20(5):1101408, Sep.-Oct. 2014.

Candés, E.J., and T. Tao, "Near Optimal Signal Recovery From Random Projections: Universal Coding Strategies?" IEEE Transactions on Information Theory 52(12):5406-5425, Dec. 2006.

Choi, J.-Y., et al., "Extremum Seeking Control for Discrete-Time Systems," IEEE Transactions on Automatic Control 47(2):318-323, Feb. 2002.

Chong, A., et al., "All-Normal-Dispersion Femtosecond Fiber Laser," Optics Express 14(21):10095-10100, Oct. 2006.

Chong, A., et al., "Properties of Normal-Dispersion Femtosecond Fiber Lasers," Journal of the Optical Society of America B 25(2):140-148, Feb. 2008.

Denk, W., et al., "Two-Photon Laser Scanning Fluorescence Microscopy," Science 248(4951):73-76, Apr. 1990.

Ding, E., and J.N. Kutz, "Operating Regimes and Performance Optimization in Mode-Locked Fiber Lasers," Optics and Spectroscopy 111(2):166-177, Aug. 2011.

Ding, E., and J.N. Kutz, "Operating Regimes, Split-Step Modeling, and the Haus Master Mode-Locking Model," Journal of the Optical Society of America B 26(12):2290-2300, Dec. 2009.

Ding, E., et al., "Generalized Master Equation for High-Energy Passive Mode-Locking: The Sinusoidal Ginzburg-Landau Equation," IEEE Journal of Quantum Electronics 47(5):705-714, May 2011.

Ding, E., et al., "High-Energy Passive Mode-Locking of Fiber Lasers," International Journal of Optics, vol. 2012, Article ID 354156, 2012, 17 pages.

Ditmire, T., et al., "Nuclear Fusion From Explosions of Femtosecond Laser-Heated Deuterium Clusters," Nature 398(6727):489-492, Apr. 1999.

Donoho, D.L., "Compressed Sensing," IEEE Transactions on Information Theory 52(4):1289-1306, Apr. 2006.

Enoch, S., et al., "A Metamaterial for Directive Emission," Physical Review Letters 89(21):213902, Nov. 2002.

Fu, X., and J.N. Kutz, "High-Energy Mode-Locked Fiber Lasers Using Multiple Transmission Filters and a Genetic Algorithm," Optics Express 21(5):6526-6537, Mar. 2013.

Fu, X., et al., "Classification of Birefringence in Mode-Locked Fiber Lasers Using Machine Learning and Sparse Representation," Optics Express 22(7):8585-8597, Apr. 2014.

Ganguli, S., and H. Sompolinsky, "Compressed Sensing, Sparsity, and Dimensionality in Neuronal Information Processing and Data Analysis," Annual Review of Neuroscience 35:485-508, Jul. 2012.

Gold, J.I., and M.N. Shadlen, "Representation of a Perceptual Decision in Developing Oculomotor Commands," Nature 404(6776):390-394, Mar. 2000.

Gordon, J.P., and H. Kogelnik, "PMD Fundamentals: Polarization Mode Dispersion in Optical Fibers," Proceedings of the National Academy of Sciences USA (PNAS) 97(9):4541-4550, Apr. 2000.

Haus, H.A., "Mode-Locking of Lasers," IEEE Journal on Selected Topics in Quantum Electronics 6(6):1173-1185, Nov.-Dec. 2000.

Herda, R., et al., "Semiconductor Quantum-Dot Saturable Absorber Mode-Locked Fiber Laser," IEEE Photonics Technology Letters 18(1):157-159, Jan. 2006.

Ilday, F.Ö. et al., "Self-Similar Evolution of Parabolic Pulses in a Laser Cavity," Physical Review Letters 92(21):213902-1-213902-4, May 2004.

Joglekar, A.P., et al., "A Study of the Deterministic Character of Optical Damage by Femtosecond Laser Pulses and Applications to Nanomachining," Applied Physics B 77(1):25-30, Aug. 2003.

Jones, L.M., et al., "Natural Stimuli Evoke Dynamic Sequences of States in Sensory Cortical Ensembles," Proceedings of the National Academy of Sciences USA (PNAS) 104(47):18772-18777, Nov. 2007.

Jones, R.C., "A New Calculus for the Treatment of Optical Systems. I. Description and Discussion of the Calculus," Journal of the Optical Society of America 31(7):488-493, Jul. 1941.

Juhasz, T., et al., "Corneal Refractive Surgery With Femtosecond Lasers," IEEE Journal of Selected Topics in Quantum Electronics 5(4):902-910, Jul.-Aug. 1999.

Kieffer, J.C., et al., "Future of Laser-Based X-Ray Sources for Medical Imaging," Applied Physics B 74(1):S75-S81, Jun. 2002.

Kim, A.D., et al., "Pulse-Train Uniformity in Optical Fiber Lasers Passively Mode-Locked by Nonlinear Polarization Rotation," IEEE Journal of Quantum Electronics 36(4):465-471, Apr. 2000.

(56) References Cited

OTHER PUBLICATIONS

Komarov, A., et al., "Multistability and Hysteresis Phenomena in Passively Mode-Locked Fiber Lasers," Physical Review A 71(5):053809-1-053809-9, May 2005.

Krstić, M., and H.H. Wang, "Stability of Extremum Seeking Feedback for General Nonlinear Dynamic Systems," Automatica 36(4):595-601, Apr. 2000.

Kutz, J.N., "Mode-Locked Soliton Lasers," SIAM Review 48(4):629-678, Jan. 2006.

Kutz, J.N., and B. Sandstede, "Theory of Passive Harmonic Mode-Locking Using Waveguide Arrays," Optics Express 16(2):636-650, Jan. 2008.

Laurent, G., et al., "Odor Encoding as an Active, Dynamical Process: Experiments, Computation and Theory," Annual Review of Neuroscience 24:263-297, Mar. 2001.

Lenz, G., et al., "All-Solid-State Femtosecond Source at 1.55 μm," Optics Letters 20(11):1289-1291, Jun. 1995.

Leyva, R., et al., "MPPT of Photovoltaic Systems Using Extremum-Seeking Control," IEEE Transactions on Aerospace and Electronic Systems 42(1):249-258, Jan. 2006.

Li, F., et al., "Dual Transmission Filters for Enhanced Energy in Mode-Locked Fiber Lasers," Optics Express 19(23):23408-23419, Nov. 2011.

Li, F., et al., "Geometrical Description of the Onset of Multi-Pulsing in Mode-Locked Laser Cavities," Journal of the Optical Society of America B 27(10):2068-2077, Oct. 2010.

Liu, X., et al., "Highly-Stable Monolithic Femtosecond Yb-Fiber Laser System Based on Photonic Crystal Fibers," Optics Express 18(15):15475-15483, Jul. 2010.

\* cited by examiner

TUNING MULTI-INPUT COMPLEX DYNAMIC SYSTEMS USING SPARSE REPRESENTATIONS OF PERFORMANCE AND EXTREMUM-SEEKING CONTROL

CROSS-REFERENCE TO RELATED APPLICATION

This application claims the benefit of Provisional Application No. 62/035,994, filed Aug. 11, 2014, the entire disclosure of which is hereby incorporated by reference herein for all purposes.

STATEMENT OF GOVERNMENT LICENSE RIGHTS

This invention was made with Government support under Grant No. DMS-1007621, awarded by the National Science Foundation (NSF), and Grant No. FA9550-09-0174, awarded by the U.S. Air Force Office of Scientific Research (AFOSR). The Government has certain rights in the invention.

BACKGROUND

Mode-locked lasers are characterized by the locking of multiple axial modes in the laser cavity, thus resulting in resonant, ultrashort pulsing phenomena. Mode-locked lasers have become commercially and scientifically successful, impacting medical imaging, two-photon microscopy, femtosecond chemistry, micro-machining, surgery, and fusion research, to name a few example fields. Fiber-based mode-locked lasers are particularly interesting due to the numerous inherent advantages of the optical fiber platform. Recent trends have shown that these fiber-based lasers may eventually achieve competitive performance with their solid-state counterparts, thus potentially shifting the field of ultra-fast, high-power lasers to fiber-based technologies. Closing the order of magnitude performance gap between fiber and solid-state lasers will involve obtaining the ability to control and optimize laser cavity output energy and pulse width.

One of the most prolific and dominant fiber-based mode-locking lasers demonstrated to date involves a linear polarizer and a number of waveplates to achieve saturable absorption via nonlinear polarization rotation (NPR). It remains challenging and expensive to find high-energy, single-pulse solutions in the multiple-NPR case. Moreover, even if mode-locking is achieved, it may be destroyed by changes to the birefringence, which often varies throughout the day based on changes in ambient conditions and may change abruptly if the laser system is physically perturbed.

What is needed are techniques for quickly and efficiently tuning a mode-locked laser or other multi-input complex dynamic system in order to automatically obtain optimal performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a self-tuning mode-locked laser system is provided. The system comprises a mode-locked laser and an optimization controller device. The mode-locked laser includes a set of optical elements and a set of servos. Each servo of the set of servos is coupled to an optical element of the set of optical elements. The optimization controller device includes a dynamic behavior model data store, a servo controller engine, a training engine, and a run-time tuning engine. The dynamic behavior model data store is configured to store a plurality of dynamic behavior models of the mode-locked laser. The servo controller engine is coupled to each of the servos of the set of servos of the mode-locked laser and is configured to use the servos to control position settings of the optical elements. The training engine is configured to instruct the servo controller engine to perform a sampling of position settings of the optical elements to create a training time series of objective function values based on an output of the mode-locked laser; create a training model based on the training time series; and store the training model and a corresponding set of optimal position settings in the dynamic behavior model data store. The run-time tuning engine is configured to instruct the servo controller engine to perform a sampling of position settings of the optical elements to create a run-time time series of objective function values based on the output of the mode-locked laser; create a run-time model based on the run-time time series; select a training model from the dynamic behavior model data store that matches the run-time model; and instruct the servo controller engine to use the servos to place the optical elements at the optimal position settings corresponding to the training model.

In some embodiments, an automated method of tuning a mode-locked laser at run-time is provided, wherein the mode-locked laser includes a set of optical elements, and wherein each optical element of the set of optical elements has a position setting. A time series of objective function value measurements is obtained while performing a sampling of the position settings of the optical elements. A model based on the time series is created. The model is compared to a plurality of models stored in a dynamic behavior model data store to find a matching model, and the position settings of the optical elements are set to match optimal position settings associated with the matching model.

In some embodiments, an automated method of creating a library of dynamic behavior models for tuning a mode-locked laser is provided, wherein the mode-locked laser includes a set of optical elements, and wherein each optical element of the set of optical elements has a position setting. The method is performed for a plurality of different environmental conditions. A time series of objective function value measurements is obtained while performing a sampling of the position settings of the optical elements. A model is created based on the time series, and the model is stored in association with a corresponding set of optimal position settings in a dynamic behavior model data store.

In some embodiments, a method of self-tuning a complex system is provided. Training is performed by measuring performance of the complex system using an objective function for a sparse sampling of input values over a given dynamic regime. A sparse representation and associated optimal input values for the given dynamic regime are stored in a dynamic behavior model data store. The training and storage are repeated for a plurality of other dynamic regimes. Performance of the complex system is measured for a sparse sampling of input values in an unknown dynamic regime. A sparse representation of the measured performance is matched to a sparse representation in the dynamic behavior model data store, and the complex system is configured with the associated optimal input values.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
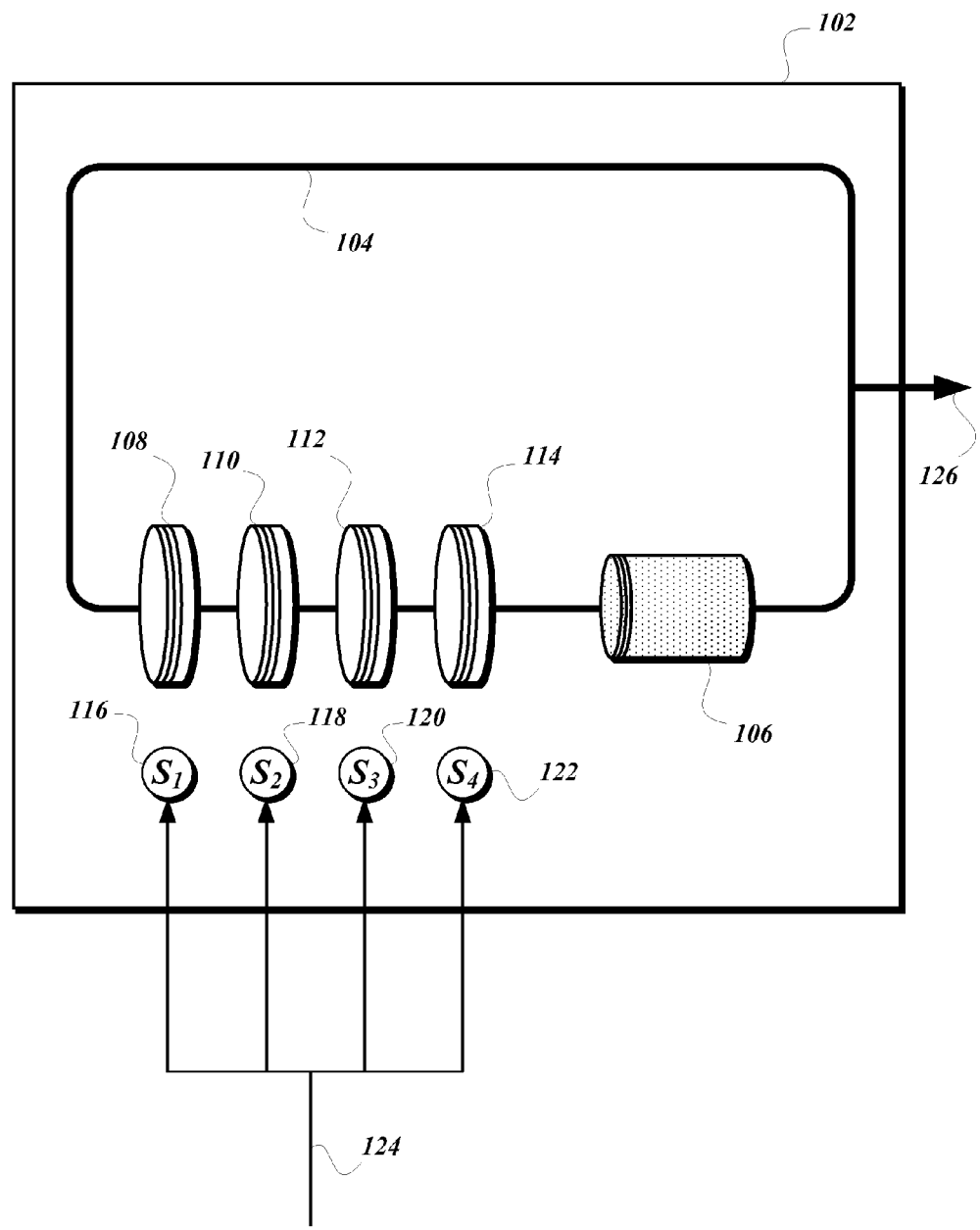
FIG. 1 is a schematic diagram that illustrates some typical features of a mode-locked laser used in various embodiments of the present disclosure.

FIG. 1 is a schematic diagram that illustrates some typical features of a mode-locked laser used in various embodiments of the present disclosure. As illustrated, the mode-locked laser 102 includes a fiber 104, a birefringence cavity 106, and a set of optical elements 108, 110, 112, 114 which may include two quarter-waveplate elements, a half-waveplate element, and a polarizer. The laser elements produce a pulse train having an output 126 of a measurable power and over a measurable spectrum.

In some embodiments, the set of optical elements 108, 110, 112, 114 may be associated with a set of servos 116, 118, 120, 122. Each servo is coupled to one of the optical elements, and upon receiving a control signal 124 or other command, is configured to change a position of its associated optical element. In some embodiments, the control signal 124 causes the servo to rotate its associated optical element to an absolute angular position setting, by a relative angular position offset from a current position, at a specified angular rate, or according to any other suitable command.

One of ordinary skill in the art will understand that a typical mode-locked laser 102 may also include additional components for the creation of the output 126, and that the mode-locked laser 102 operates using well-understood physical principles. Because the creation and operation of a mode-locked laser is within the abilities of one of ordinary skill in the art, those components and further details of the functioning of a mode-locked laser (other than the novel tuning techniques disclosed below) are not provided herein for the sake of brevity.

While in theory it is possible to mathematically model the cavity of a mode-locked laser 102 in order to determine optimal positions for the optical elements 108, 110, 112, 114, it is not practical in practice. Various environmental factors affect birefringence within the mode-locked laser 102, including but not limited to an ambient temperature and the physical configuration or stresses on the fiber 104. The actual birefringence of the elements of the mode-locked laser 102 varies chaotically for different environmental factors, and while a dynamic regime given one set of environmental factors may behave in a stable manner, a change in any of the environmental factors will cause the dynamic regime of the mode-locked laser 102 to be altered in unpredictable ways. Accordingly, mode-locked lasers capable of self-tuning based on observations of output performance are desired. It is also desirable to have mode-locked lasers that, once initially configured, can self-adjust settings in order to maintain performance in the presence of changing environmental factors that may affect birefringence within the mode-locked laser.

Figure 2:
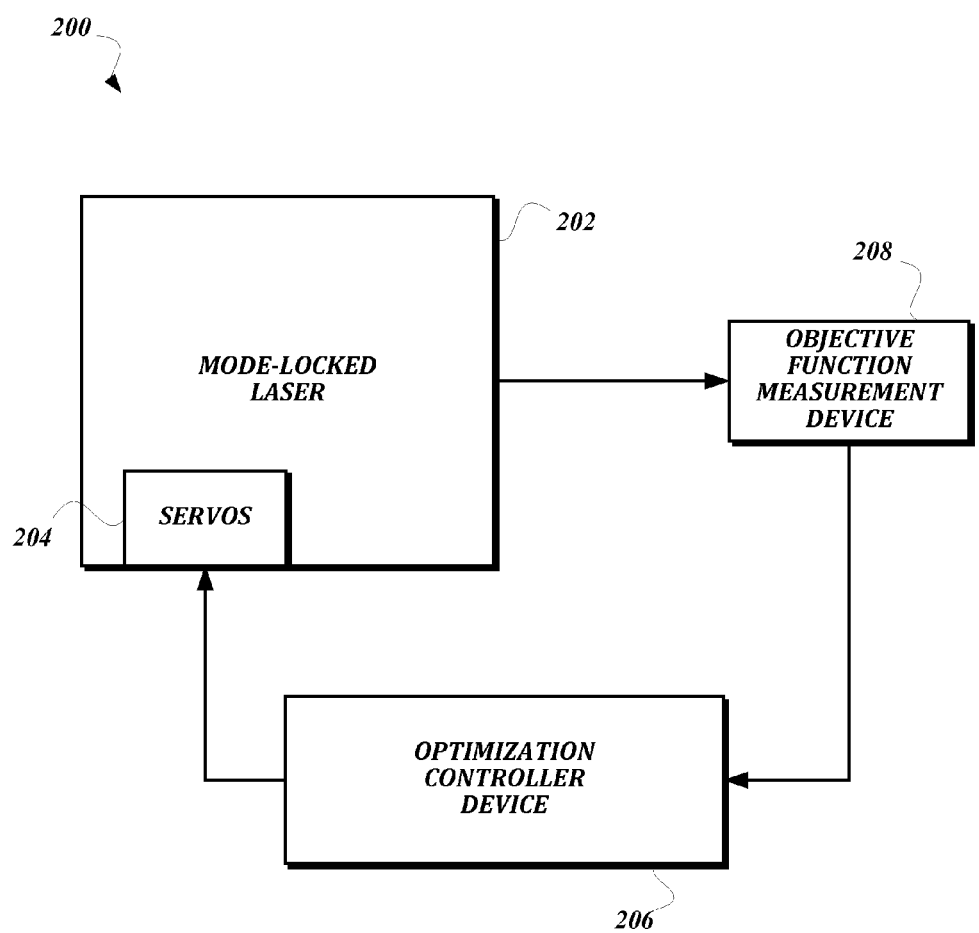
FIG. 2 is a block diagram that illustrates an exemplary embodiment of a self-tuning mode-locked laser system according to various aspects of the present disclosure.

FIG. 2 is a block diagram that illustrates an exemplary embodiment of a self-tuning mode-locked laser system according to various aspects of the present disclosure. As illustrated, the system 200 includes a mode-locked laser 202, an objective function measurement device 208, and an optimization controller device 206. The mode-locked laser 202 is similar to the mode-locked laser 102 illustrated in FIG. 1, though this mode-locked laser 202 is integrated into the system 200. Accordingly, the mode-locked laser 102 includes a set of servos 204 similar to the servos 116, 118, 120, 122 illustrated above, and a set of optical elements (not illustrated) associated with the servos 204 and similar to the optical elements 108, 110, 112, 114 illustrated above.

The output 126 of the mode-locked laser 202 is provided at least to an objective function measurement device 208. In some embodiments, the output 126 may be provided to the objective function measurement device 208 using an optical splicer, an output coupler, or any other connection known to one of ordinary skill in the art. The objective function measurement device 208 is communicatively coupled to the optimization controller device 206, and provides objective function values that measure performance of the mode-locked laser 202 to the optimization controller device 206. The optimization controller device 206 is communicatively coupled to the servos 204 of the mode-locked laser 202, and uses the objective function values to alter positions of the optical elements using the servos 204. Further details describing each of these components are provided below.

In some embodiments, the components of the system 200 are combined within a single housing or device. In some embodiments, the objective function measurement device 208, optimization controller device 206 and/or one or more servos 204 may be provided in one or more separate housings or devices, and may be coupled to an existing mode-locked laser 202 to allow the existing laser to be tuned using the techniques described herein.

Figure 3:
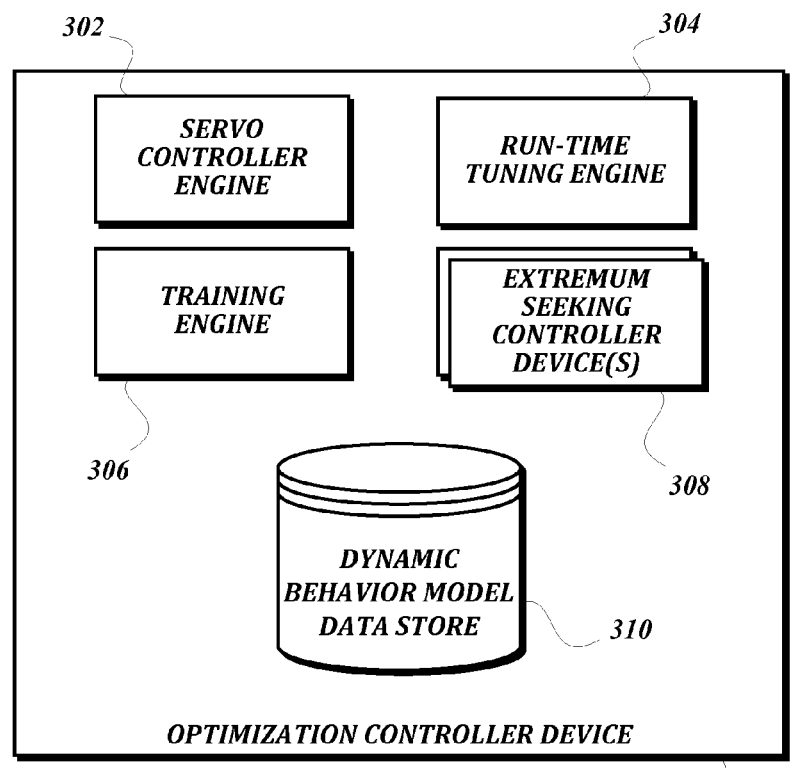
FIG. 3 is a block diagram that illustrates an exemplary embodiment of an optimization controller device according to various aspects of the present disclosure.

FIG. 3 is a block diagram that illustrates an exemplary embodiment of an optimization controller device according to various aspects of the present disclosure. As illustrated, the optimization controller device 206 includes a servo controller engine 302, a run-time tuning engine 304, and a training engine 306. In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, Matlab, and/or the like. An engine may be compiled into executable programs or written in interpreted programming languages. Software engines may be callable from other engines or from themselves. Generally, the engines described herein refer to logical modules that can be merged with other engines or applications, or can be divided into sub-engines. The engines can be stored in any type of computer-readable medium or computer storage device and be stored on and executed by one or more general purpose computing devices, thus creating a special purpose computing device configured to provide the engine. The logic associated with an engine can also be programmed into a computing device such as an ASIC, an FPGA, a microcontroller, and/or the like, thus also creating a special purpose computing device configured to provide the engine.

The servo controller engine 302 is communicatively coupled to the servos 204 and is configured to provide the servos 204 with instructions to adjust the position settings of the optical elements 108, 110, 112, 114.

The training engine 306 is configured to characterize the performance of the laser 202 across a range of relevant parameter variation, and to build a library of dynamic behavior models associated with optimal settings. Each model describes the performance of the laser 202 in a particular dynamic regime that affects the birefringence of the mode-locked laser 202. The training engine 306 receives objective function values from the objective function measurement device 208, and provides instructions to the servo controller engine 302 to use the servos 204 to change the positions of the optical elements 108, 110, 112, 114 based on the objective function values. It is contemplated that the training engine 306 would perform its training actions on a mode-locked laser 202 to create the library of dynamic behavior models, which would then be used by other parts of the system 200 at run-time.

The run-time tuning engine 304 is configured to perform a shorter search of the parameter space compared to the search performed by the training engine 306, and to use the resulting objective function values to compare the current performance of the mode-locked laser 202 with the models created by the training engine 306. As with the training engine 306, the run-time tuning engine 304 receives objective function values from the objective function measurement device 208 and provides instructions to the servo controller engine 302 to use the servos 204 to change the positions of the optical elements 108, 110, 112, 114 based on the objective function values.

As illustrated, the optimization controller device 206 also includes a set of extremum-seeking controller devices 308. In some embodiments, there is one extremum-seeking controller device 308 for each servo 116, 118, 120, 122 or optical element 108, 110, 112, 114. In some embodiments, these multiple extremum-seeking controller devices 308 may be combined into a single extremum-seeking controller device 308 that provides instructions to more than one servo. The functionality of the run-time tuning engine 304, the training engine 306, and the extremum-seeking controller devices 308 are described further below.

The engines and extremum-seeking controller devices of the optimization controller device 206 are described as separate components for ease of description. In some embodiments, two or more of these components may be provided by a single computing device. Likewise, in some embodiments, the features described herein as being provided by a single component may be provided by two or more computing devices.

As illustrated, the optimization controller device 206 also includes a dynamic behavior model data store 310. As understood by one of ordinary skill in the art, a "data store" as described herein may be any suitable device configured to store data for access by a computing device. One example of a data store is a highly reliable, high-speed relational database management system (RDBMS) executing on one or more computing devices and accessible over a high-speed network. However, any other suitable storage technique and/or device capable of quickly and reliably providing the stored data in response to queries may be used, such as a key-value store, an object database, and/or the like. Further, the computing device providing the data store may be accessible locally instead of over a network, or may be provided as a cloud-based service. A data store may also include data stored in an organized manner on a computer-readable storage medium, as described further below. Another example of a data store suitable for use with embodiments of the present disclosure is a file system or database management system that stores data in files (or records) on a computer readable medium such as flash memory, random access memory (RAM), hard disk drives, and/or the like. One of ordinary skill in the art will recognize that separate data stores described herein may be combined into a single data store, and/or a single data store described herein may be separated into multiple data stores, without departing from the scope of the present disclosure.

The dynamic behavior model data store 310 is configured to store a library of dynamic behavior models and optimal settings for a variety of dynamic regimes generated by the training engine 306. The dynamic behavior model data store 310 is also configured to search the library of dynamic behavior models for a model matching measurements obtained by the run-time tuning engine 304. The performance of all of these activities is described in further detail below.

Figure 4:
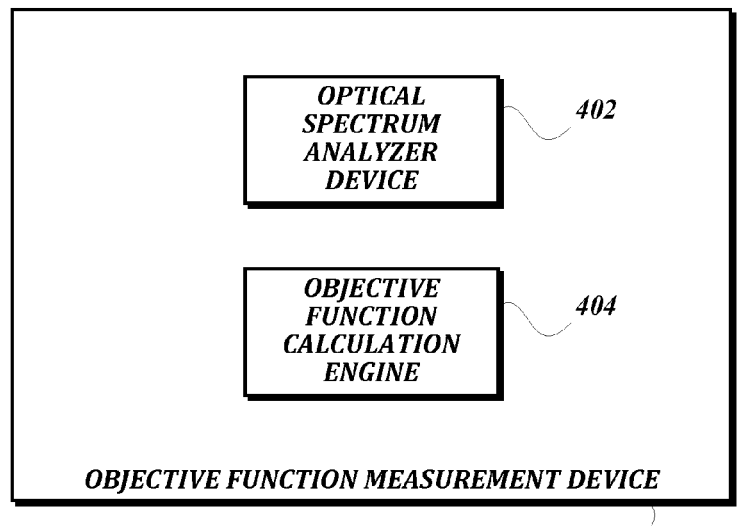
FIG. 4 is a block diagram that illustrates an exemplary embodiment of an objective function measurement device according to various aspects of the present disclosure.

FIG. 4 is a block diagram that illustrates an exemplary embodiment of an objective function measurement device according to various aspects of the present disclosure. As illustrated, the objective function measurement device 208 includes an optical spectrum analyzer device 402 and an objective function calculation engine 404. The optical spectrum analyzer device 402 receives a portion of the output 126 of the mode-locked laser 202, and is configured to determine the energy of the output and the spectrum of the output. Optical spectrum analyzer devices 402 are well known in the art, as are devices such as optical splitters and optical splicers that may be used to provide the portion of the output to the optical spectrum analyzer device 402, and so further description of how the device functions to produce these values is not provided herein for the sake of brevity. The objective function calculation engine 404 is configured to use the energy and spectrum values obtained by the optical spectrum analyzer device 402 to calculate an objective function value to be provided to the optimization controller device 206. Further description of these actions is provided below.

Figure 5A:
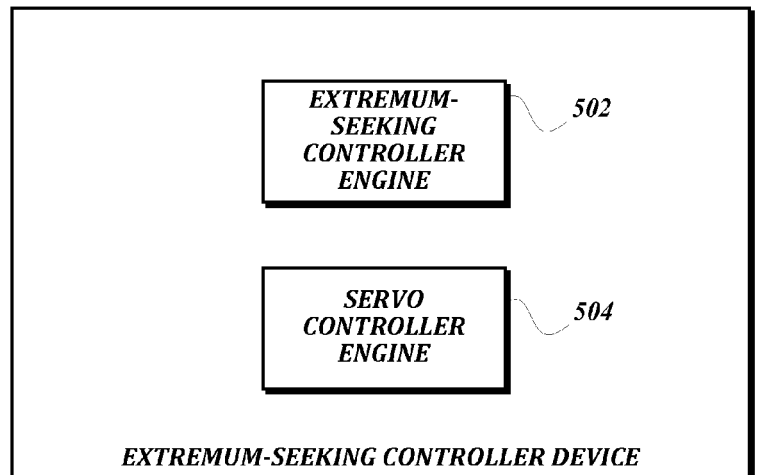
FIG. 5A is a block diagram that illustrates an exemplary embodiment of an extremum seeking controller device according to various aspects of the present disclosure.

FIG. 5A is a block diagram that illustrates an exemplary embodiment of an extremum seeking controller device according to various aspects of the present disclosure. As illustrated, the extremum-seeking controller device 308 includes an extremum-seeking controller engine 502 and a servo controller engine 504. The servo controller engine 504, much like the servo controller engine 302 of the optimization controller device 206, receives instructions to adjust position settings of at least one of the optical elements 108, 110, 112, 114 of the mode-locked laser 202, and transmits instructions to at least one of the servos 204 to implement the position setting adjustments. The extremum-seeking controller engine 502 provides a perturbation signal to the servo controller engine 504 which causes the position setting of an associated optical element to be sinusoidally altered. The extremum-seeking controller engine 502 then uses objective function values from the objective function measurement device 208 to determine whether the position setting of the optical element should be adjusted.

Figure 5B:
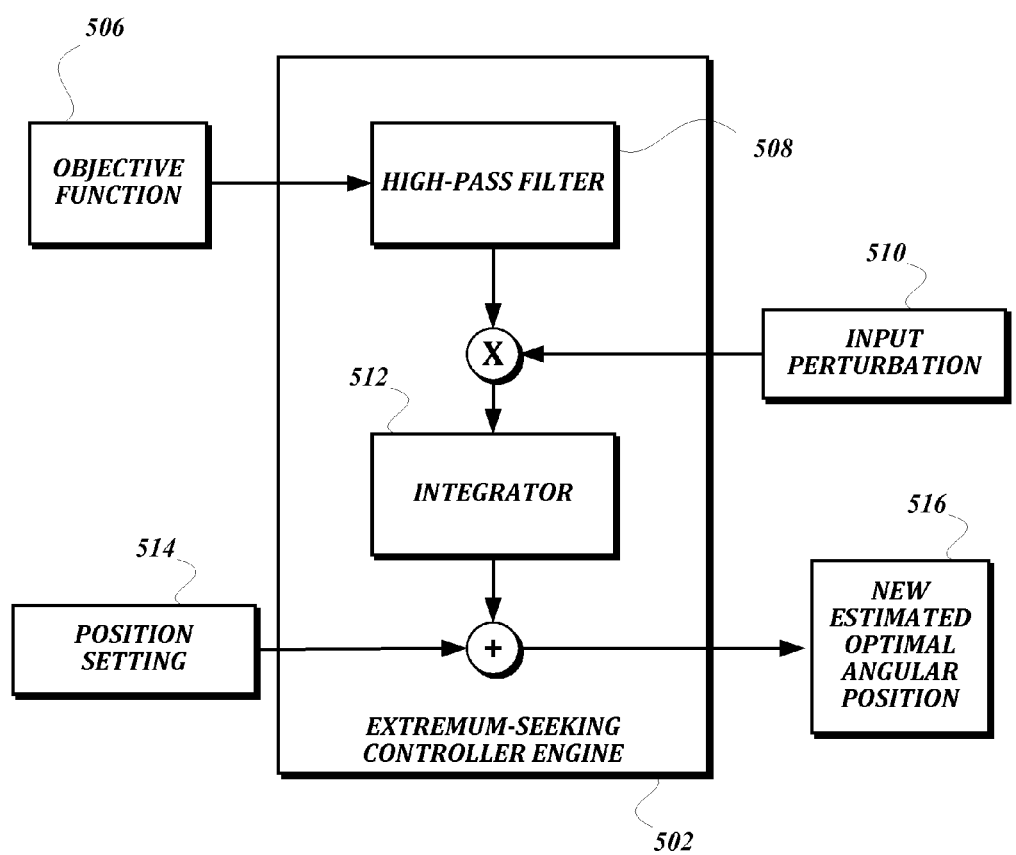
FIG. 5B is a schematic diagram that illustrates elements of processing that is performed by the extremum-seeking controller engine according to various aspects of the present disclosure.
Figure 6A:
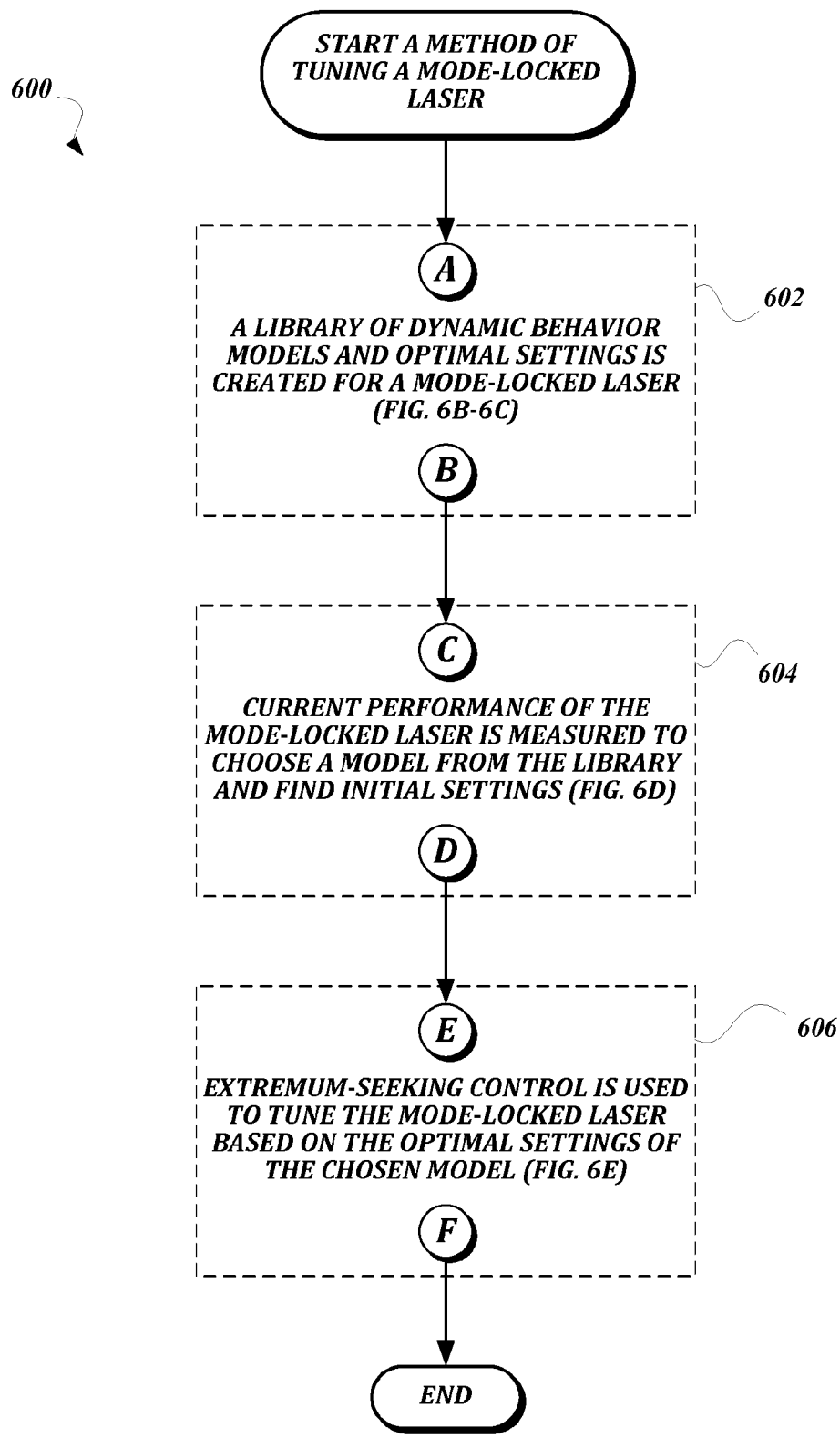
FIGS. 6A-6E are a flowchart that illustrates an exemplary embodiment of a method of tuning a mode-locked laser according to various aspects of the present disclosure.
Figure 6B:
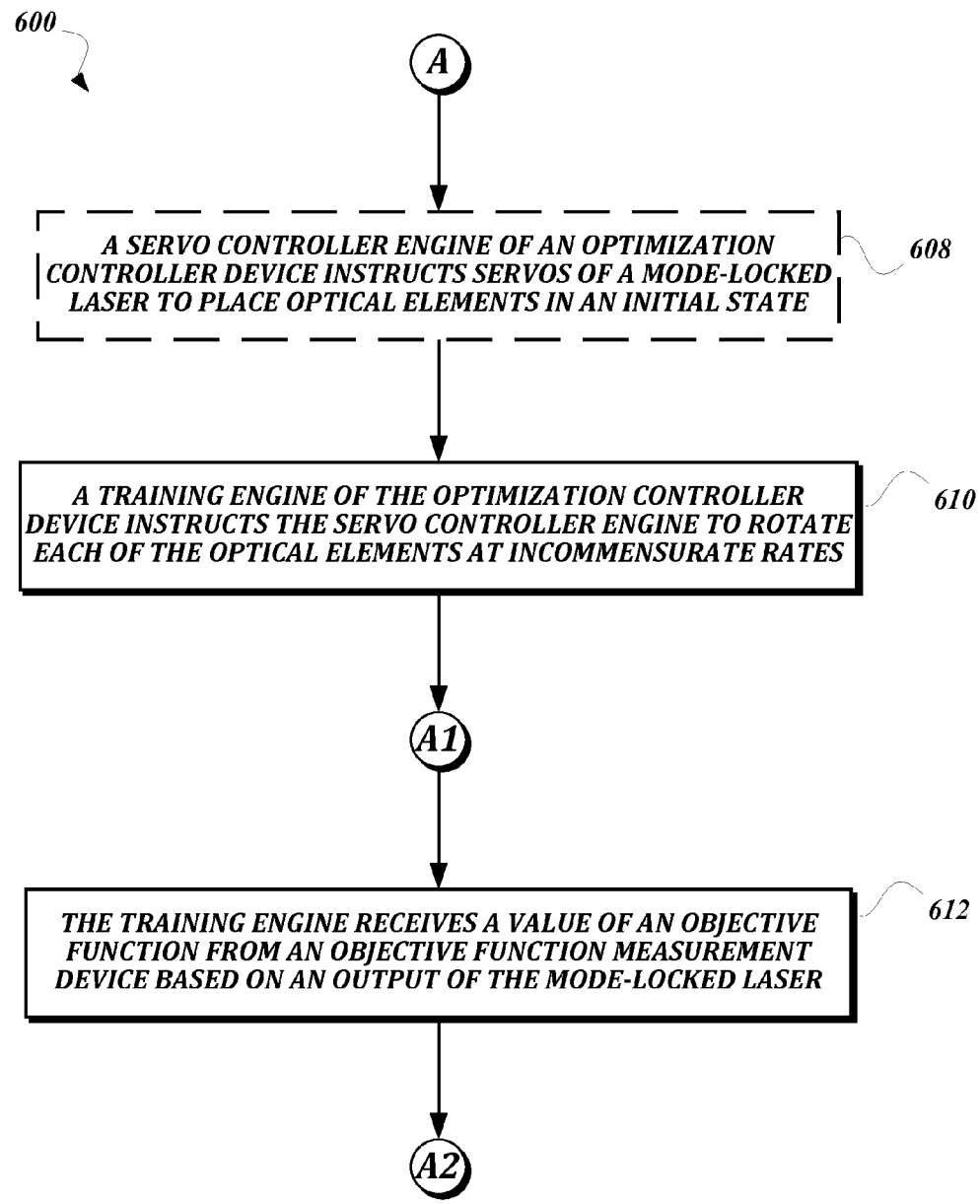
Figure 6C:
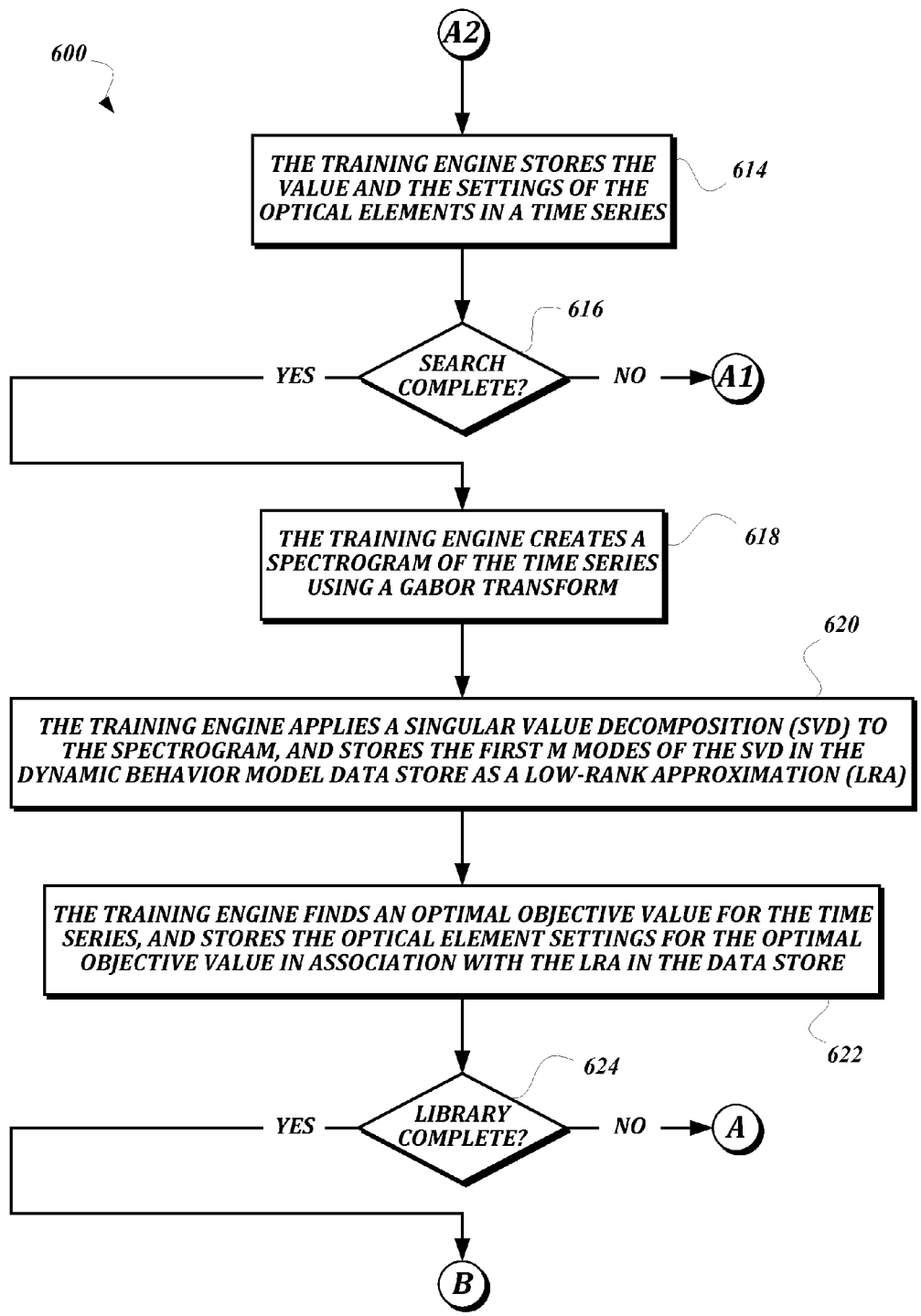
Figure 6D:
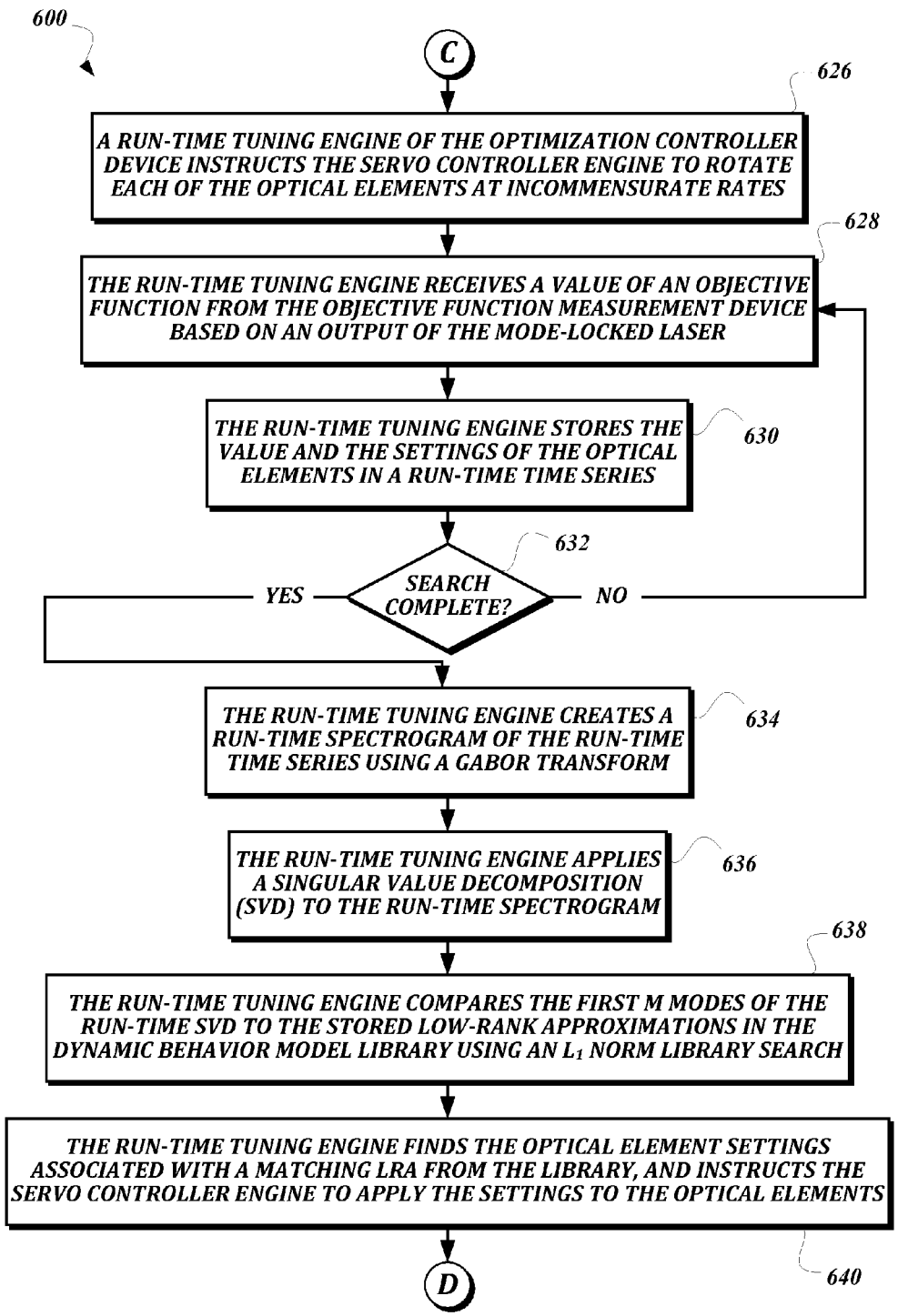
Figure 6E:
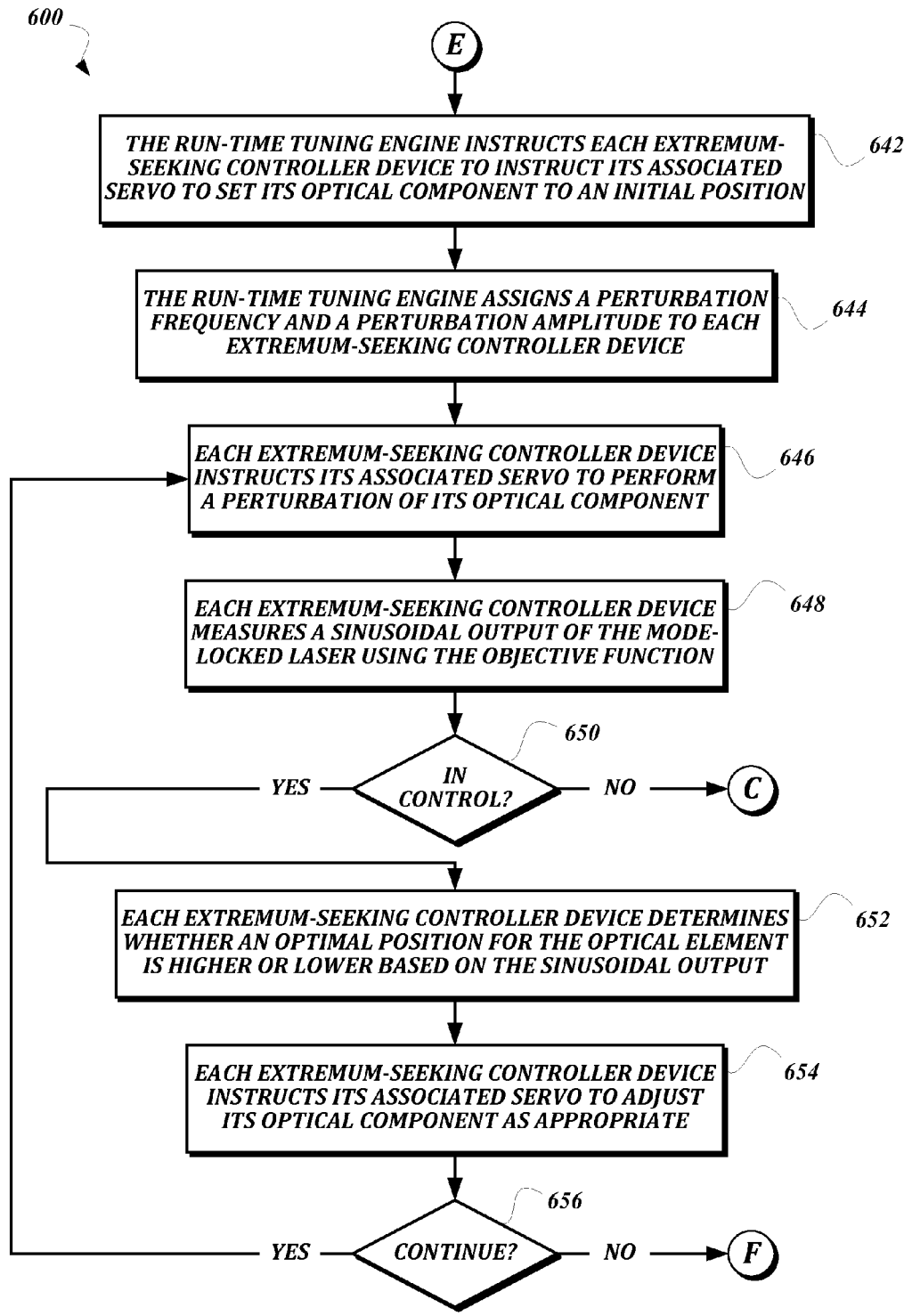

FIG. 5B is a schematic diagram that illustrates elements of processing that is performed by the extremum-seeking controller engine 502 according to various aspects of the present disclosure. Output of the objection function measurement device 208 is provided as objective function values 506 to the extremum-seeking controller engine 502. These values are provided to a high-pass filter 508 to generate a signal p that oscillates about zero mean. This signal $\rho$ is multiplied by the input perturbation 510, such as $\alpha \sin(\omega t + \beta)$ to yield a demodulated signal $\xi$ that is positive when the current position setting is less than the ideal position setting and is negative when the current position setting is greater than the ideal position setting. Accordingly, the demodulated signal $\xi$ is integrated by an integrator 512 and added to the current position setting 514 to generate a new estimated optimal angular position setting 516.

FIGS. 6A-6E are a flowchart that illustrates an exemplary embodiment of a method of tuning a mode-locked laser according to various aspects of the present disclosure. From a start block, the method 600 proceeds to a set of method steps 602 defined between an entry terminal ("terminal A") and an exit terminal ("terminal B"), where a library of dynamic behavior models and optimal settings is created for a mode-locked laser 202.

From terminal A (FIG. 6B), the method 600 proceeds to optional block 608, where a servo controller engine 302 of an optimization controller device 206 instructs servos 204 of a mode-locked laser 202 to place optical elements 108, 110, 112, 114 in an initial state. Block 608 is illustrated as optional because in some cases, the parameter space search of method 600 may start from any state and produce similar results, or in other cases, the optical elements 108, 110, 112, 114 may be configured to automatically be biased to an initial position when power is removed from the servos 204 (e.g., for a rotatable optical element, a weight may be placed on one edge such that the weighted point will rotate to the bottom when power to the associated servo is removed, thus causing the optical element to be in an initial state such as zero-degree dead center without any action being performed).

Next, at block 610, a training engine 306 of the optimization controller device 206 instructs the servo controller engine 302 to rotate each of the optical elements 108, 110, 112, 114 at incommensurate rates. This means that the ratio of each of the angular rates is an irrational number, and so after a large enough time, a sampling scheme that performs periodic measurements will approach arbitrarily close to every point in the input space. For rotatable elements such as the optical elements 108, 110, 112, 114, the result of the "incommensurate rate" rotations is a multidimensional toroidal search of the possible settings. Rotating elements in a single direction at a given rate is an efficient technique for performing a search of settings for elements that can rotate through 360 degrees at least because little mechanical stress (or time wasted on moving to the next setting) is placed on the servos and optical elements. In other embodiments, a different search technique for efficiently obtaining a sample of position settings may be used. For non-rotatable elements or other settings which are not naturally periodic, similar searches may be performed by turning the setting into a periodic variable by scanning from a start value to an end value and then back to the start value again.

The method 600 then proceeds to a continuation terminal ("terminal A1"), and then to block 612, where the training engine 306 receives a value of an objective function from an objective function measurement device 208 based on an output 126 of the mode-locked laser 202. In some embodiments, the rotation of the optical elements 108, 110, 112, 114 may stop periodically for a stable measurement to be obtained for given position settings. In some embodiments, the measurements may be obtained so quickly that the speed at which the position settings are changed does not materially affect collection of the objective function values.

For measuring the performance of a mode-locked laser 202, an objective function with local maxima that correspond to high-energy mode-locked solutions is desirable. Accordingly, an appropriate objective function to use divides the energy function (E) by the kurtosis ($\kappa$) of the Fourier spectrum of the waveform, which is large for undesirable chaotic solutions. This objective function is large when there is a large amount of energy in a tightly confined temporal wave packet. The kurtosis of a signal $\chi$ is given by the fourth moment about the mean divided by the square of the variance:

$$\kappa = \frac{E[(\chi - \overline{\chi})^4]}{(E[(\chi - \overline{\chi})^2])^2}$$

The objective function is then given by:

$$O = \frac{E}{\kappa}$$

In some embodiments, the kurtosis and the energy function are both calculated by the optical spectrum analyzer device 402, and are provided to the objective function calculation engine 404 for computation of the objective function.

Once the value of the objective function is received, the method 600 proceeds to a continuation terminal ("terminal A2"), and from terminal A2 (FIG. 6C) to block 614, where the training engine 306 stores the value and the settings of the optical elements that correspond to the value in a time series. In some embodiments, the time series may be stored in RAM or other volatile memory associated with the training engine 306. In some embodiments, the time series may be at least temporarily stored in the dynamic behavior model data store 310 in an area appropriate for storage of time series values.

Next, at decision block 616, a determination is made regarding whether the search of position settings is complete. Some non-limiting examples of how this determination may be made include determining whether the search has been running for a predetermined amount of time or has produced a predetermined number of measurements, determining whether a predetermined percentage of coverage of the parameter space has been obtained, determining whether the objective function values have converged to a value that exceeds a predetermined threshold, determining whether a predetermined objective function values greater than a predetermined threshold have been obtained, and/or the like.

In an exemplary embodiment, collecting measurements for five minutes is adequate for a complete search. In this embodiment, the slowest rate of revolution is between 0.5 hertz and 1.0 hertz, such that for a five minute search, the slowest optical element is rotated 150-300 times, and the other optical elements are rotated at incommensurately faster rates. The objective function measurement device 208, in this embodiment, can be configured to generate objective function values at a rate anywhere from 10 hertz to 100 hertz or faster in order to generate a sufficient number of measurements for a complete search of position settings. In other embodiments, the optical elements may be rotated faster or slower than these speeds, and the objective function values may be generated at a lower or greater rate.

If the result of the determination at decision block 616 is NO, then the method 600 returns to terminal A1 to obtain an additional objective function value for new position settings. Otherwise, if it has been determined that enough objective function values have been obtained to adequately model the performance of the mode-locked laser 202, then the result of the determination at decision block 616 is YES. Accordingly, the method 600 proceeds to block 618, where the training engine 306 creates a spectrogram of the time series using a Gabor transform. It has been observed that the time series collected from the toroidal sampling comprises various frequency components that are exhibited at different times. Although the Fourier transform of the signal contains all frequency information, there is no indication of when each frequency occurs in time. Indeed, by definition, the Fourier transform eliminates all time-domain information since we integrate over all time. To circumvent the limitation of the direct application of Fourier transform, the following modification to the Fourier transform kernel may be used to keep information in both time and frequency:

$$g_{t,\bar{\omega}}(\tau) = e^{i\bar{\omega}\tau} g(\tau - t)$$

The filter g (τ–t) is introduced with the aim of localizing both time and frequency. The Gabor transform is then defined as:

$$\tilde{f}_g(t,\bar{\omega}) = \int_{-\infty}^{\infty} f(T) g(\tau - t) e^{-i\omega\tau} d\tau$$

In this equation, the bar denotes the complex conjugate of the function. Thus, the function g(τ–t) acts as a time filter for localizing the signal and its frequency content over a specific window of time, allowing for the construction of a spectrogram that represents a time series (signal) in both the time and spectral domain. These spectrograms are unique for varying cavity birefringence. Thus, the spectrogram serves as a proxy measure for classifying the underlying cavity birefringence. In some embodiments, because the spectrograms are symmetric in frequency, only the positive frequency part of the spectrograms may be used for classification purposes to provide storage and computation efficiency benefits. While a Gabor transform is described above, in some embodiments, other wavelet transforms could be used to create the spectrogram.

At block 620, the training engine 306 applies a singular value decomposition (SVD) to the spectrogram, and stores the first M modes of the SVD in the dynamic behavior model data store 310 as a low-rank approximation (LRA) of the spectrogram. Given the spectrogram $S_k$, the SVD is applied by performing the following:

$$S_k = U_k \Sigma_k V_k^*$$

and $$U_k = [u_{k_1} u_{k_2} \ldots U_{k_n}]$$

The first m (where m<n) modes of $U_k$ are kept as the LRA.

At block 622, the training engine 306 finds an optimal objective value for the time series, and stores the optical element settings for the optimal objective value in association with the LRA in the dynamic behavior model data store 310. In some embodiments, the optimal objective value may be the highest value for the time series. In some embodiments, the highest value may not result in stable operation, and a next-higher value, or a value from a high, flat peak in the parameter space may be more desirable. Such cases may be detected at run-time when stable operation of the mode-locked laser cannot be maintained, and a next-higher value for the time series may be used as the optimal objective value.

The method 600 then proceeds to decision block 624, where a determination is made regarding whether the library stored in the dynamic behavior model data store 310 is complete. If more models are desired within the library, then the result of the determination at decision block 624 is NO, and the method 600 returns to terminal A. Otherwise, if no more models are desired within the library, then the result of the determination at decision block 624 is YES, and the method 600 proceeds to a continuation terminal ("terminal B"). In some embodiments, the determination of whether the library is complete may include whether a predetermined number of different models have been obtained. In some embodiments, the determination may include determining that new models are matching existing models at a predetermined rate. In some embodiments, a factor known to affect the dynamics of the system (though in an unpredictable way) may be changed, such as intentionally increasing or decreasing the ambient temperature; intentionally changing a twist, stress, or other force on the fiber; and/or the like, before moving on to generate a new model.

From terminal B (FIG. 6A), the method 600 proceeds to a set of method steps 604 defined between an entry terminal ("terminal C") and an exit terminal ("terminal D"), wherein current performance of the mode-locked laser 202 is measured to choose a model from the library stored in the dynamic behavior model data store 310 and find initial settings for the optical elements. In some embodiments, the set of method steps 604 would be performed, for example, upon an activation or power-up of the mode-locked laser 202 to perform initial tuning. Because of the unpredictable dynamics within the mode-locked laser 202, a technique such as the set of method steps 604 is preferable for characterizing the current dynamic regime based on measurements of output at different position settings, as opposed to testing environmental variables and thereby trying to predict the current dynamic regime, at least because using the set of method steps 604 is both quicker and more reliable.

From terminal C (FIG. 6D), the method 600 proceeds to block 626, where a run-time tuning engine 304 of the optimization controller device 206 instructs the servo controller engine 302 to rotate each of the optical elements 108, 110, 112, 114 at incommensurate rates. At block 628, the run-time tuning engine 304 receives a value from the objective function measurement device 208 of an objective function based on an output 126 of the mode-locked laser 202, and at block 630, the run-time tuning engine 304 stores the value and the settings of the optical elements in a run-time time series. In some embodiments, the actions described in blocks 626-630 are similar to the actions described in blocks 610-614, as a similar time series is being constructed. Accordingly, one can refer to the above description of blocks 610-614 for further details describing these actions, which have not been repeated here for the sake of brevity.

The method 600 then proceeds to a decision block 632, where a determination is made regarding whether the search of position settings is complete. Similar to the determination described with respect to decision block 616, the determination may be based on an amount of time, a number of measurements, a percentage of coverage of the parameter space, and/or any of the other techniques described above. In some embodiments, the determination at decision block 632 may use the same criteria as the determination at decision block 616. In some embodiments, the criteria used in decision block 632 may use a similar technique to the criteria used in decision block 616, but may collect less data because less information is needed to form an effective low-rank approximation for comparison to the existing models in the library. For example, if decision block 616 uses a given time period for its criteria, such as five minutes, decision block 632 may use a shorter time period, such as thirty seconds, in order to collect an adequate amount of data to match an existing model in the library.

If the result of the determination is that the search of the parameter space is not yet complete, then the determination at decision block 632 is NO, and the method 600 returns to block 628 to obtain another value for the time series. Otherwise, if the result of the determination is that the search of the parameter space is complete, then the determination at decision block 632 is YES, and the method 600 proceeds to block 634, where the run-time tuning engine 304 creates a run-time spectrogram of the time series using a Gabor transform, and block 636, where the run-time tuning engine 304 applies a singular value decomposition (SVD) to the run-time spectrogram. Again, the actions described at block 634-636 are similar to the actions described in blocks 618-620, so further details are not described here for the sake of brevity. For example, as described above with respect to block 618, in some embodiments wavelet transforms other than a Gabor transform may be used.

Next, at block 638, the run-time tuning engine 304 compares the first M modes of the run-time SVD to the stored low-rank approximations in the dynamic behavior model library stored in the dynamic behavior model data store 310 using an $L_1$-norm library search. In the $L_1$-norm search, the objective is to find a vector:

$$a = \underset{a}{\operatorname{argmin}} \|a\|_1$$

subject to:

$$U_L \cdot a = u_{m_1}$$

In some embodiments, the number of library modes should be greater than the dimensionality of the frequency domain so that this becomes an undetermined linear system of equations. The $L_1$-norm minimization produces a sparse vector a wherein only a small portion of the elements are non-zero. The non-zero elements of the vector a act as a classifier or indicator function for identifying which sub-library the birefringence falls into. Thus, if the largest element falls into the i-th sub-library, the recognized birefringence value is equal to $K_i$. This sparsity promoting optimization, when used in conjunction with the unique spectrograms, gives a rapid and accurate classification scheme for the dynamic regime, thus the dynamic regime can easily be recognized. In some embodiments, more sophisticated sparse classification/recognition strategies may be used that also find a model that is similar enough to the run-time model to determine that we're in a matching dynamic regime. In some embodiments, the closest model may be provided. In some embodiments, an error may be returned if a closeness threshold can't be reached or a matching model otherwise cannot be found. If no matching model can be found, the method 600 may transition back to the set of method steps 602 and gather a new low-rank approximation for a new model. In some embodiments, the run-time tuning engine 304 may continue collecting time series data until either a matching model can be found, or until enough time series data has been collected to save as a new model. As illustrated, the flowchart and method 600 assumes that a matching model has been found.

Once a matching model has been found in the dynamic behavior model data store 310, the method 600 proceeds to block 640 where the run-time tuning engine 304 finds the optical element settings associated with a matching low-rank approximation from the library, and instructs the servo controller engine 302 to apply the settings to the optical elements 108, 110, 112, 114. The method 600 then proceeds to terminal D.

At this point, the method 600 has determined a current dynamic regime in which the mode-locked laser 202 is operating, and has placed the optical elements 108, 110, 112, 114 in positions that were previously determined to be a best guess as to an optimal position for the dynamic regime. The method 600 then proceeds from terminal D (FIG. 6A) to a set of method steps 606 defined between an entry terminal ("terminal E") and an exit terminal ("terminal F") wherein extremum-seeking control is used to tune the mode-locked laser 202 based on the optimal settings of the chosen model. Extremum-seeking control is an adaptive control law that finds and tracks local maxima of the objective function by sinusoidally varying a set of input parameters and measuring the consequent variation of the objective function. The resulting controller does not rely on the model of the dynamics that relate input parameters to the objective function, making it especially useful for complex, nonlinear systems such as the mode-locked laser 202 that have disturbances that are difficult to model. Instead, the measured variation in the objective function is compared with the varying input signal to dynamically improve an estimate of the optimal input parameter. In some embodiments, the best guess of the optimal input parameter from the library may be used, but this value might only be close to the actual optimal settings (and will not be updated as performance changes over time). Using the extremum-seeking control technique disclosed herein can obtain settings closer to the actual optimal settings, and can maintain optimal performance even if the dynamics of the system change unpredictably over time.

From terminal E (FIG. 6E), the method 600 proceeds to block 642, where the run-time tuning engine 304 instructs each extremum-seeking controller device 308 to instruct its associated servo 116, 118, 120, 122 to set its optical component to an initial position. In some embodiments, if the set of method steps 606 is being performed after the set of method steps 604, the actions described in block 642 may not be necessary, as they may have already been performed in block 640. If so, then block 642 may simply inform the extremum-seeking controller devices 308 of the current positions of the optical components.

Next, at block 644, the run-time tuning engine 304 assigns a perturbation frequency and a perturbation amplitude to each extremum-seeking controller device 308. In assigning the frequencies and amplitudes, there are several considerations. For example, there are three distinct time scales of interest: slow, which includes external disturbances to be rejected; medium, which includes the perturbation frequency ω; and fast, which includes internal system dynamics. The perturbation frequency ω should be chosen to be faster than the external disturbances such as slow changes in birefringence and slower than the internal system dynamics. For the mode-locked laser 202, the internal dynamics are extremely fast compared with the time that it takes to change the positions of the optical elements 108, 110, 112, 114. The amplitude of the perturbation a should be sufficiently large so that there is a measurable perturbation in the output of the system. A larger a also results in faster convergence to the optimal settings. However, a should not be so large that there is significant steady-state error due to oscillations about the peak. Faster convergence is also obtainable by increasing the gain k of the integrator 512, although this may also destabilizing the system for large enough k. The cut-off frequency $\omega_h$ for the high pass filter 508 is based on the perturbation frequency ω.

In some embodiments, the perturbation frequencies and amplitudes for each extremum-seeking controller device 308 are related. For example, if four extremum-seeking controller device 308 loops are present, the perturbation frequencies for each device should satisfy the property that $\omega_i + \omega_j \neq \omega_k$ for any i, j, k=1, 2, . . . , n. This protects against the possibility of bias arising from demodulation. In some embodiments, the same perturbation frequency may be used for each pair of even and odd controllers, so that $\omega_k = \omega_{k+1}$ as long as they are out of phase: $\beta_k = 0$ and $$\beta_{k+1} = \frac{\pi}{2}.$$

At block 646, each extremum-seeking controller device 308 instructs its associated servo 116, 118, 120, 122 to perform a perturbation of its optical component. In response, the servo controller engine 504 of the extremum-seeking controller device 308 causes its associated servo to "wiggle" its associated optical component around its position setting. In some embodiments, this wiggle may be performed continuously at the previously determined amplitude and frequency. At block 648, each extremum-seeking controller device 308 measures a sinusoidal output of the mode-locked laser 202 using the objective function. The extremum-seeking controller device 308 receives the objective function values from the objective function measurement device 208. The sinusoidal form of output is a sinusoidal pattern of objective function values, as opposed to any raw output of the mode-locked laser 202.

The method 600 then proceeds to a decision block 650, where a determination is made regarding whether the system 200 is still in control. In some embodiments, if the objective function measurement device 208 determined that mode-locking has failed, or if the objective function values have otherwise dropped below a predetermined threshold, it may be determined that the system 200 has fallen out of control. One likely cause of this might be that the dynamic regime has changed due to a change in environmental conditions, and that the optimal positions have jumped to a different position too far away from the current position for the extremum-seeking control to find. If the result of the determination is that the system has fallen out of control, then the result of the decision block 650 is NO, and the method 600 returns to terminal C to perform the set of method steps 604 and place the system back in control. Otherwise, if the determination is that system 200 remains in control, then the result of the decision block 650 is YES, and the method 600 proceeds to block 652.

At block 652, each extremum-seeking controller device 308 determines whether an optimal position for the optical element is higher or lower based on the sinusoidal output, and at block 654, each extremum-seeking controller device 308 instructs its associated servo 116, 118, 120, 122 to adjust its optical component as appropriate. One of ordinary skill in the art will recognize that FIG. 5B and the related text include additional details of performing this extremum-seeking control technique.

The method 600 then proceeds to a decision block 656, where a determination regarding whether or not to continue is made. This determination is usually based on whether or not the mode-locked laser 202 is still in a powered or operating state. If the result of the determination is that the extremum-seeking control should continue, then the result of the decision block 656 is YES, and the method 600 returns to block 646. Otherwise, if the result of the determination is that the extremum-seeking control should end, then the result of the decision block 656 is NO, and the method 600 proceeds to terminal F.

From terminal F (FIG. 6A), the method 600 proceeds to an end block and terminates. One of ordinary skill in the art will recognize that, although illustrated together, certain parts of the method 600 can be performed separately. For example, the set of method steps 602 for building the library of models may be performed without proceeding to the rest of the method. As another example, the set of method steps 604 for finding initial settings may be performed with a pre-existing library of models, and may not use the set of method steps 606 for extremum-seeking control (or may use a different extremum-seeking control scheme than the one described in the set of method steps 606).

Figure 7:
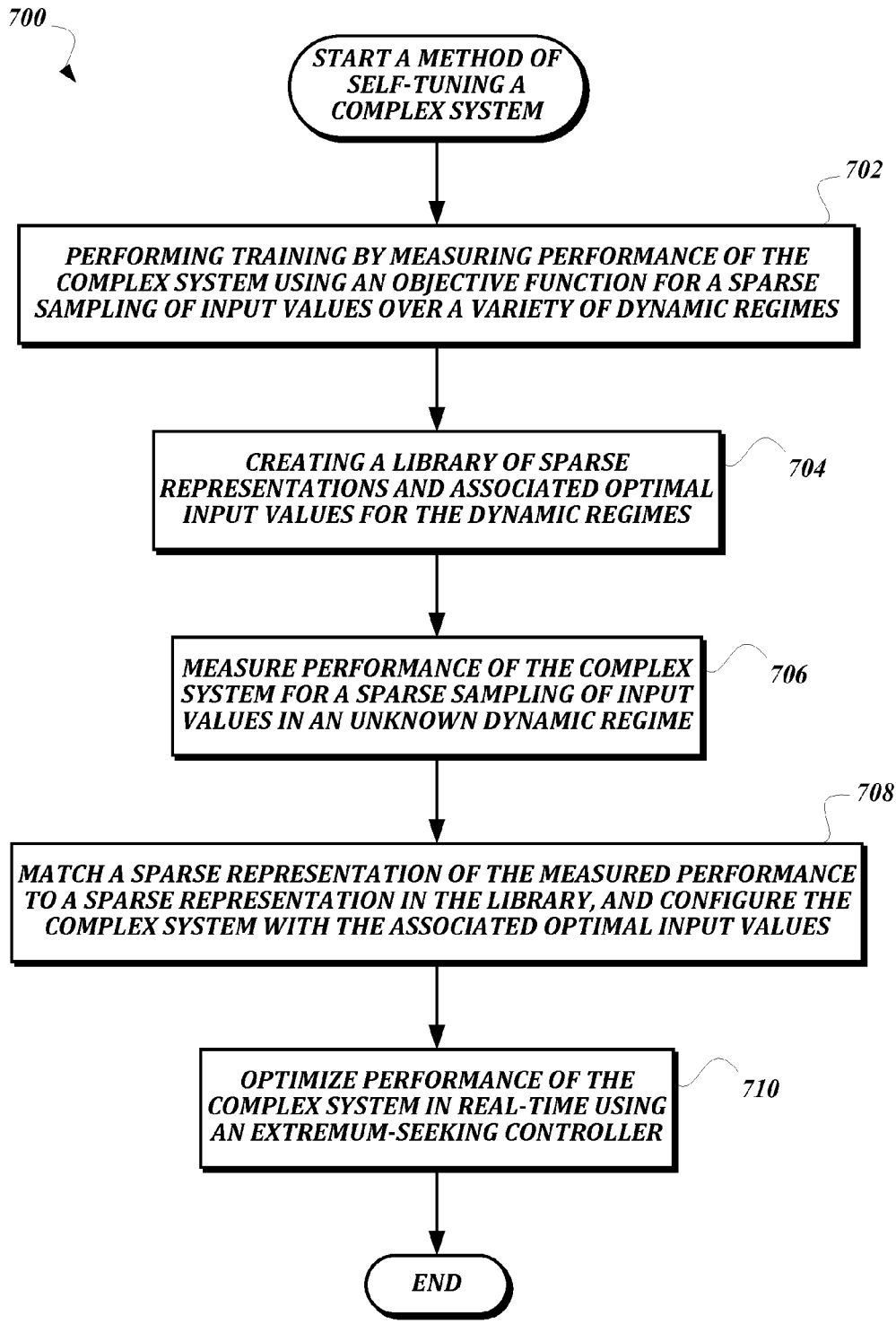
FIG. 7 is a flowchart that illustrates an exemplary embodiment of a method of self-tuning a complex system according to various aspects of the present disclosure.

While the method 600 described above relates to a specific example of using the disclosed techniques for tuning a mode-locked laser, similar techniques may be used for other complex dynamic systems that have a plurality of inputs and no easy way of determining which of a plurality of dynamic regimes in which the system is operating. FIG. 7 is a flowchart that illustrates an exemplary embodiment of a method 700 of self-tuning a complex system according to various aspects of the present disclosure. Embodiments of the method 700 include embodiments of the method 600 illustrated and described above, but are also applicable to systems other than mode-locked lasers.

From a start block, the method 700 proceeds to block 702, where training is performed by measuring performance of the complex system using an objective function for a sparse sampling of input values over a variety of dynamic regimes. In some embodiments, the dynamic regime is held constant while a sparse sampling is obtained for the given dynamic regime, and then a new sparse sampling is obtained for a different dynamic regime. At block 704, a library of sparse representations and associated optimal input values is created for the dynamic regimes.

Once the library is created, the method 700 proceeds to block 706, where performance of the complex system is measured for a sparse sampling of input values in an unknown dynamic regime. At block 708, a sparse representation of the measured performance is matched to a sparse representation in the library, and the complex system is configured with the optimal input values associated with the matching sparse representation in the library. In some embodiments, the method 700 may then also proceed to block 710, where performance of the complex system is optimized in real-time using an extremum-seeking controller. The method 700 then proceeds to an end block and terminates.

One example of a complex system that may be tuned using the techniques described above is a phased array antenna. Phase-array antennas are of growing importance due to their ability to actively produce directed electromagnetic energy patterns. Phased array antennas can be manipulated in order to control the relative phases of the respective signals feeding the antennas that make up the array. In so doing, the effective radiation pattern of the array is reinforced in a desired direction and suppressed in undesired direction. Thus an antenna array is a group of multiple active antennas coupled to a common source or load to produce a directive radiation pattern. Usually, the spatial relationship of the individual antennas also contributes to the directivity of the antenna array. Use of the term "active antennas" is intended to describe elements whose energy output is modified due to the presence of a source of energy in the element (other than the mere signal energy which passes through the circuit) or an element in which the energy output from a source of energy is controlled by the signal input. The term "active antennas" also suggest that control principles can be used to manipulate the arrays to produce a desired radiation pattern. One common application of this is with a standard multi-band television antenna, which has multiple elements coupled together.

In military applications, phased array radar systems are highly desirable due to the rapidity with which the beam can be steered. Thus phased array radars allow a warship, for instance, to use one radar system for surface detection and tracking (finding ships), air detection and tracking (finding aircraft and missiles) and missile uplink capabilities. Before using these systems, each surface-to-air missile in flight required a dedicated fire-control radar, which meant that ships could only engage a small number of simultaneous targets. Phased array systems can be used to control missiles during the mid-course phase of the missile's flight. During the terminal portion of the flight, continuous-wave fire control directors provide the final guidance to the target. Because the radar beam is electronically steered, phased array systems can direct radar beams fast enough to maintain a fire control quality track on many targets simultaneously while also controlling several in-flight missiles. In such dynamic phased arrays, each array element incorporates an adjustable phase shifter that are collectively used to move the beam with respect to the array face. Dynamic phased arrays require no physical movement to aim the beam. The beam is moved electronically. This can produce antenna motion fast enough to use a small pencil-beam to simultaneously track multiple targets while searching for new targets using just one radar set (track while search).

As an example, an antenna with a 2 degree beam with a pulse rate of 1 kHz will require approximately 16 seconds to cover an entire hemisphere consisting of 16,000 pointing positions. This configuration provides 6 opportunities to detect a Mach 3 vehicle over a range of 100 km (62 mi), which is suitable for military applications. The position of mechanically steered antennas can be predicted, which can be used to create electronic countermeasures that interfere with radar operation. The flexibility resulting from phased array operation allows beams to be aimed at random locations, which eliminates this vulnerability. This is also desirable for military applications.

Much like the mode-locked laser, a learning module can be executed on the phase-array antenna in order to learn the regions (via a toroidal search) that produce the optimal system behavior based upon one or more objective functions. The library of learned behavior can then be utilized with a sparse number of measurements on the emitted electromagnetic field in order to rapidly identify the state of the system. Thus the controller can rapidly push the system to almost optimal behavior before the extremum-seeking control is applied to keep the radar array stabilized even in the presence of disturbances. Such an algorithm would not only be transformative to standard phased-array antennas, but also to the newly emerging technologies of holographic, meta-material arrays.

Figure 8:
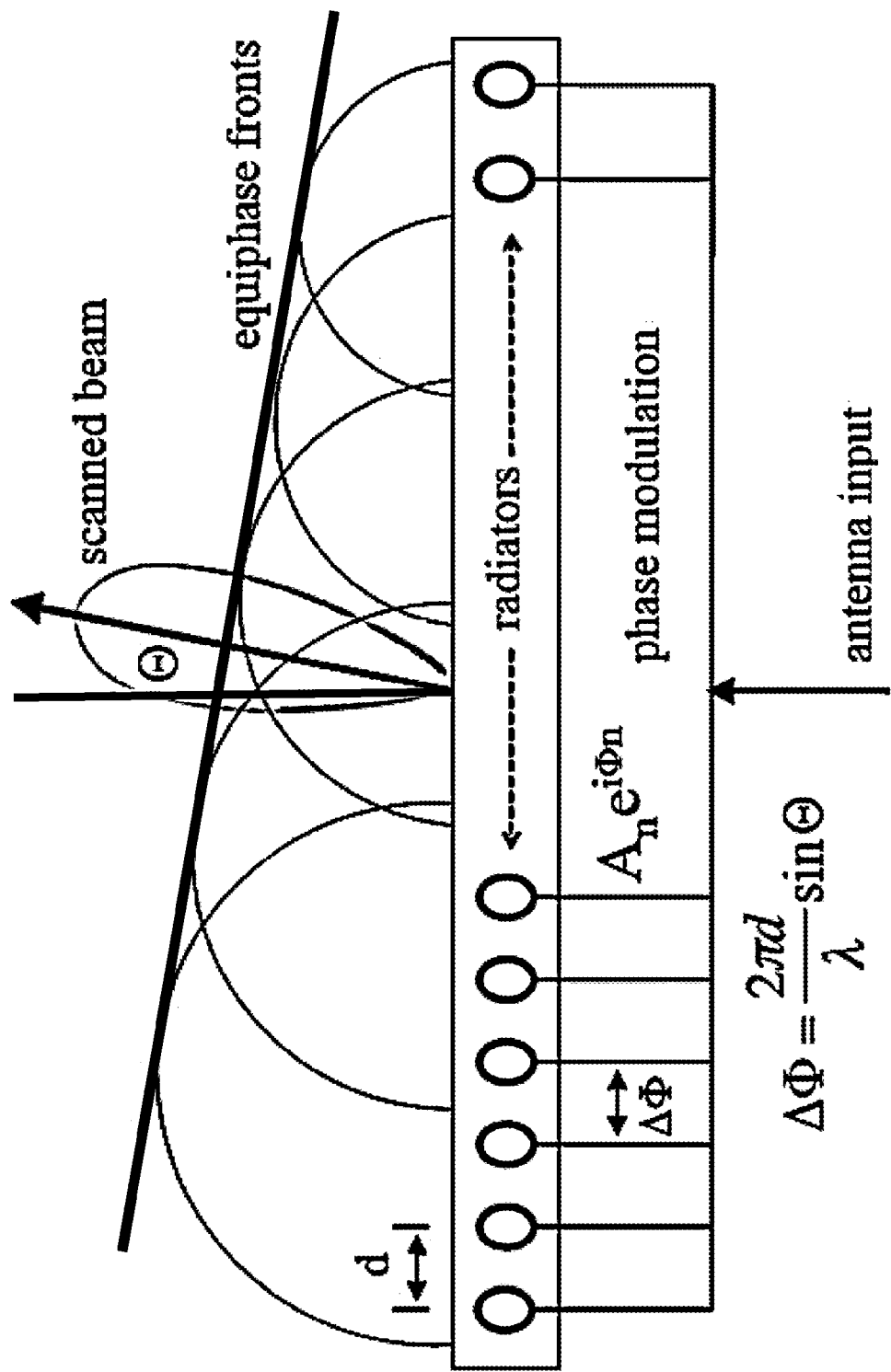
FIG. 8 is a schematic diagram of an exemplary embodiment of a phased array antenna appropriate to be tuned using the techniques described herein.

FIG. 8 is a schematic diagram of an exemplary embodiment of a phased array antenna appropriate to be tuned using the techniques described above. The ability to electronically produce phase-shifting in a principled way provides rapid control and adjustment of the scanning electromagnetic beam. The self-tuning techniques described herein provide an intelligent way of robustly producing the desired beam alignment. In some embodiments, a typical objective function used to measure the output of the system would be $$J=(M-S)^2$$

wherein M is a measurement of the main energy beam and S is a measurement of sidelobe energy. Any suitable technique may be used to measure the energies of the main energy beam and the sidelobe energy. For example, a signal strength may be reported by a target of the main energy beam (such as a satellite) to determine M, and S may be determined by inference using a difference between M and the energy supplied to generate the main energy beam. More generally, an objective function for measuring the output of the phased array antenna may be stated as:

$$J=\int_{-\pi}^{\pi}(E(\theta)k(\theta))^2 d\theta$$

wherein $E(\theta)$ is the measurement at a given angle, and $k(\theta)$ is a kernel for weighting the measurement at the given angle. For example, the typical objective function above may be stated in this format by defining the kernel as follows:

$$k = \begin{Bmatrix} 1, & M \\ -1, & S \end{Bmatrix}$$

Other kernels, such as a kernel that smoothly transitions from the S value to the M value, may also be used.

Another example of a complex system that may be tuned using the techniques described above is a neurostimulation system such as one used in the emerging field of deep brain stimulation (DBS). In particular, the techniques disclosed herein represent a critical advancement in providing a principled approach to understanding how to stimulate the hippocampus in order to suppress or enhance key features of neural activity associated with symptoms of certain movement and psychiatric disorders. This could be of value to pioneers in DBS. DBS Therapy is an adjustable and reversible treatment that uses a surgically implanted device, similar to a heart pacemaker, to deliver mild electrical pulses to precisely targeted areas of the brain. The stimulation can be programmed and adjusted by a trained clinician to maximize symptom control and minimize side effects. Patients also have a small hand-held controller that allows them to turn the system on and off, and in some cases, adjust their own stimulation settings within a range set their doctor. Currently, the stimulation protocols are governed by expert in the loop doctors. However, the techniques disclosed herein propose to replace these assessments, or work with such critical insight, to develop an automatic and principled approach to achieving best performance.

The construction of such models are imperative for not only a fundamental understanding of memory encoding/decoding tasks, but also for constructing controls laws appropriate for aiding in such tasks. Of driving interest is the ability to use such data to also inform efficient control strategies when stimulating memory regions using devices from industrial manufacturers such as NeuroPace and Medtronic. On a basic level, sparsity will play a role in any modeling efforts. Sparsity of data plays a role in these efforts due to the fact that only a limited number of sensors can be placed in the hippocampus, for both state read-out and stimulus-based control strategies.

New theoretical efforts have revealed that despite the constraints of sparse recording and stimulation, great advantage can be taken of such limited measurements. Specifically, advances in neuroscience over the past decade have revealed two critical, and seemingly ubiquitous, phenomena: (i) that meaningful input/output of signals in high-dimensional networks of neurons are encoded in low-dimensional patterns of dynamic activity, and (ii) that sparsity plays a key role in encoding and decoding strategies, especially in neural computation. This typifies the state-of-the-art in neuroscience, which manifests the most sophisticated functionality in information processing and computation known in any system. Such observations lead us to conjecture that neural ECoG recordings, and other modalities of invasive and non-invasive data, will allow us to probe the latent, low-dimensional structure of neural activity relating to a variety of neurological disorders, including memory deficits. A direct implication of such a data-driven modeling strategy is that we can gain traction on prediction, state estimation, and control of multiple neurological disorders, including PTSD, major depression, borderline personality disorder, general anxiety disorder, TBI, substance abuse/addiction, fibromyalgia/chronic pain, and epilepsy.

The modeling effort proposed provides transformative analytic and computational methods of sparse sampling, adaptive control and machine learning (dimensionality reduction) to provide an optimal model capable of efficient neural state identification and closed-loop feedback, control that is robust, adaptive, and implementable with minimal (sparse) computation. Adaptive feedback control fits naturally in the equation-free framework described above and is ideal for high-dimensional neural systems with slowly varying low-dimensional behavior. In particular, extremum-seeking control is a model-free adaptive control algorithm that seeks to maximize or minimize an objective function wrapped around a nonlinear system. The method probes the dynamic input-output relationship to obtain an estimate of the objective function gradient, allowing stable and efficient optimization. In conjunction with machine learning to classify basic dynamic regimes, adaptive control can offer robust performance, including disturbance rejection, improved reference tracking and bandwidth, and measurement noise attenuation.

To understand how such a seemingly complex biological system such as the hippocampus can robustly, efficiently, and accurately process neural information, one must fundamentally understand the intersection and integration of (i) sparse networks of neurons, (ii) adaptive control theory and (iii) compressive sensing, each of which has individually evoked a paradigm shift in their respective fields. The successful integration of these methods, which also falls broadly under machine learning strategies, has the potential to revolutionize our understanding of how memory encoding/decoding strategies are biophysically constructed in the hippocampus, thereby revealing the fundamental nature of the algorithms enacted for processing stimulus and enacting control. More broadly, these studies highlight a potential central paradigm of memory: That sparsity is leveraged to its full advantage in making classification decisions and informing control strategies in memory encoding/decoding. Such strategies are also highly useful for neurostimulation devices, as the smaller the number of recording and stimulation sites, the lower the number of constraints on battery power and energy consumption for the electronic devices. Thus, sparsity is not only a theoretical conception, but it also has a direct technological impact on hippocampus stimulation strategies.

Figure 9:
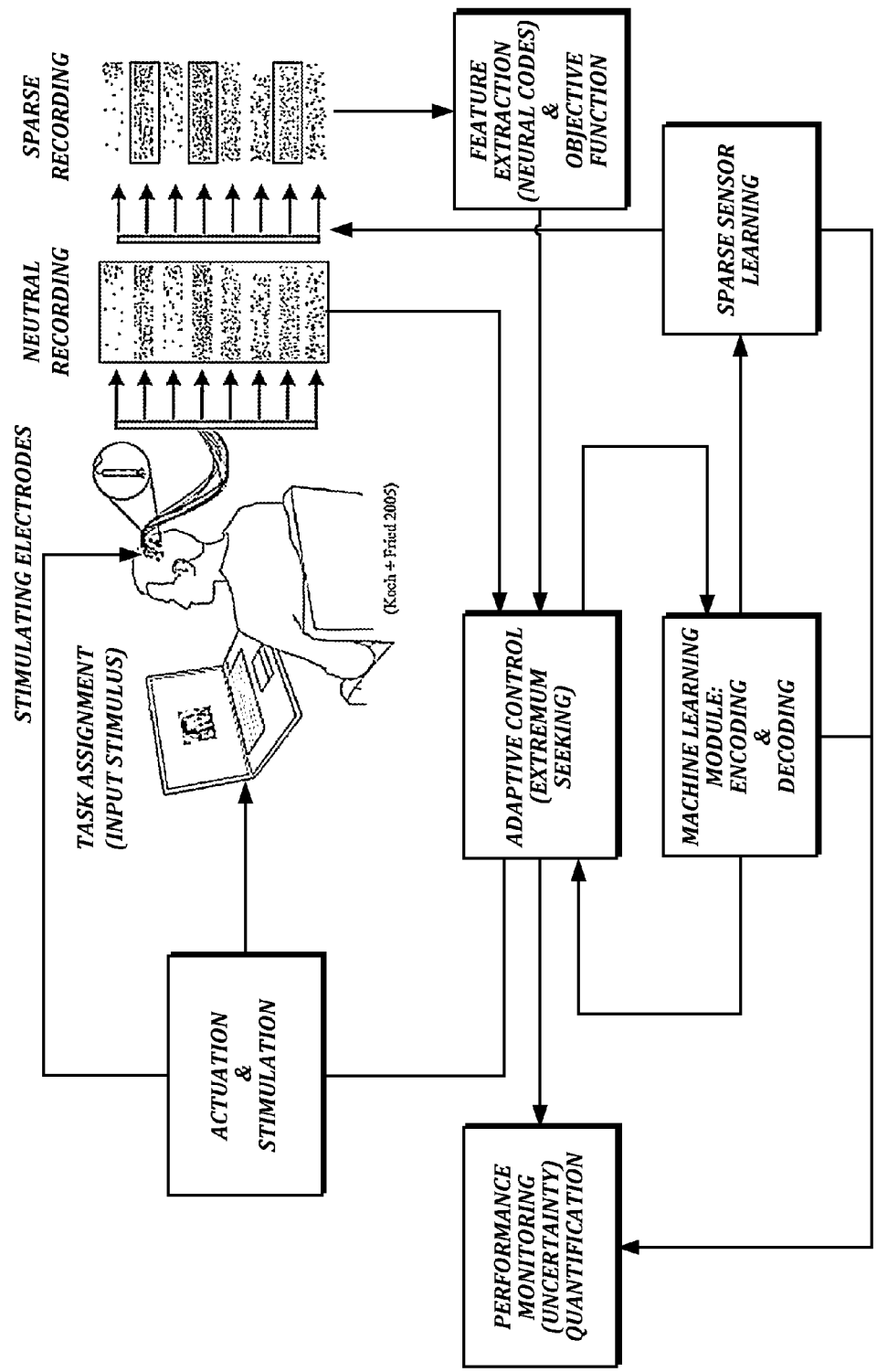
FIG. 9 is a schematic diagram of an exemplary embodiment of a neurostimulation system appropriate to be tuned using the techniques described herein.

FIG. 9 is a schematic diagram of an exemplary embodiment of a neurostimulation system appropriate to be tuned using the techniques described above. A brain state may be modeled using a function such as:

$$x = \Sigma a_j \gamma_j$$

wherein $\gamma_j$ represents a neural code, and $a_j$ represents a strength or weighting of the neural code. Some example objective functions may be $J = a_j^2$ for the suppression of j (seizure, depression), or $J = (a_j - 1)^2$ to enhance j (such as for memories, motor actions, and/or the like).

Figure 10:
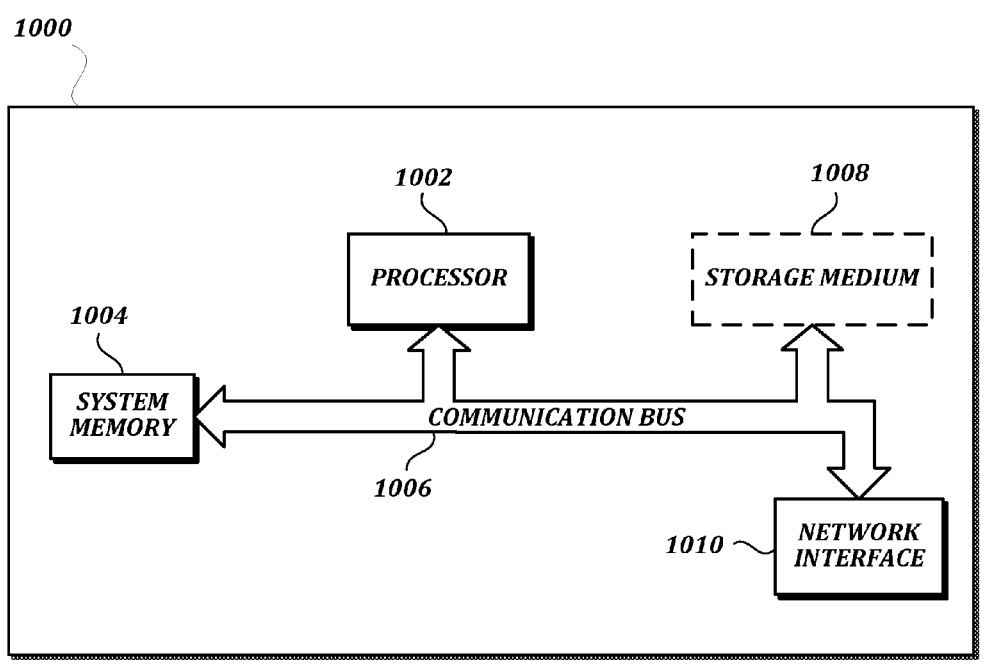
FIG. 10 is a block diagram that illustrates an exemplary embodiment of a computing device appropriate for use with embodiments of the present disclosure.

FIG. 10 is a block diagram that illustrates an exemplary embodiment of a computing device appropriate for use with embodiments of the present disclosure. While multiple different types of computing devices were discussed above, the exemplary computing device 1000 describes various elements that are common to many different types of computing devices. While FIG. 10 is described with reference to a computing device that is implemented as a device on a network, the description below is applicable to servers, personal computers, mobile phones, smart phones, tablet computers, embedded computing devices, microcontrollers, FPGAs, ASICs, and other devices that may be used to implement portions of embodiments of the present disclosure. Moreover, those of ordinary skill in the art and others will recognize that the computing device 1000 may be any one of any number of currently available or yet to be developed devices.

In its most basic configuration, the computing device 1000 includes at least one processor 1002 and a system memory 1004 connected by a communication bus 1006. Depending on the exact configuration and type of device, the system memory 1004 may be volatile or nonvolatile memory, such as read only memory ("ROM"), random access memory ("RAM"), EEPROM, flash memory, or similar memory technology. Those of ordinary skill in the art and others will recognize that system memory 1004 typically stores data and/or program modules that are immediately accessible to and/or currently being operated on by the processor 1002. In this regard, the processor 1002 may serve as a computational center of the computing device 1000 by supporting the execution of instructions.

As further illustrated in FIG. 10, the computing device 1000 may include a network interface 1010 comprising one or more components for communicating with other devices over a network. Embodiments of the present disclosure may access basic services that utilize the network interface 1010 to perform communications using common network protocols. The network interface 1010 may also include a wireless network interface configured to communicate via one or more wireless communication protocols, such as WiFi, 2G, 3G, LTE, WiMAX, Bluetooth, and/or the like. As will be appreciated by one of ordinary skill in the art, the network interface 1010 illustrated in FIG. 10 may represent one or more wireless interfaces or physical communication interfaces described and illustrated above with respect to particular components of the system 100.

In the exemplary embodiment depicted in FIG. 10, the computing device 1000 also includes a storage medium 1008. However, services may be accessed using a computing device that does not include means for persisting data to a local storage medium. Therefore, the storage medium 1008 depicted in FIG. 10 is represented with a dashed line to indicate that the storage medium 1008 is optional. In any event, the storage medium 1008 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1004 and storage medium 1008 depicted in FIG. 10 are merely examples of computer-readable media.

Suitable implementations of computing devices that include a processor 1002, system memory 1004, communication bus 1006, storage medium 1008, and network interface 1010 are known and commercially available. For ease of illustration and because it is not important for an understanding of the claimed subject matter, FIG. 10 does not show some of the typical components of many computing devices. In this regard, the computing device 1000 may include input devices, such as a keyboard, keypad, mouse, microphone, touch input device, touch screen, tablet, and/or the like. Such input devices may be coupled to the computing device 1000 by wired or wireless connections including RF, infrared, serial, parallel, Bluetooth, USB, or other suitable connections protocols using wireless or physical connections. Similarly, the computing device 1000 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A self-tuning mode-locked laser system, comprising:
    a mode-locked laser, including:
        a set of optical elements; and
        a set of servos, wherein each servo of the set of servos is coupled to an optical element of the set of optical elements;
    an optimization controller device, including:
        a dynamic behavior model data store configured to store a plurality of dynamic behavior models of the mode-locked laser;
        a servo controller engine coupled to each of the servos of the set of servos and configured to use the servos to control position settings of the optical elements; and
        a training engine configured to:
            instruct the servo controller engine to perform a sampling of position settings of the optical elements to create a training time series of objective function values based on an output of the mode-locked laser;
            create a training model based on the training time series; and
            store the training model and a corresponding set of optimal position settings in the dynamic behavior model data store; and
        a run-time tuning engine configured to:
            instruct the servo controller engine to perform a sampling of position settings of the optical elements to create a run-time time series of objective function values based on the output of the mode-locked laser;
            create a run-time model based on the run-time time series;
            select a training model from the dynamic behavior model data store that matches the run-time model; and
            instruct the servo controller engine to use the servos to place the optical elements at the optimal position settings corresponding to the training model.

2. The system of claim 1, wherein performing a sampling of position settings of the optical elements includes:
    performing a toroidal search of angular positions of the optical elements by instructing the servo controller engine to cause the servos to rotate the optical elements at incommensurate rates.

3. The system of claim 1, wherein creating a training model based on the training time series comprises:
    creating a spectrogram of the training time series; and
    applying a singular value decomposition (SVD) to the spectrogram;
    wherein a low-rank approximation (LRA) of the SVD is used as the training model.

4. The system of claim 3, wherein creating a spectrogram of the training time series includes performing a wavelet transform.

5. The system of claim 4, wherein the wavelet transform is a Gabor transform.

6. The system of claim 2, wherein the corresponding set of optimal angular positions is a set of angular positions in the time series for which the objective function had a greatest value.

7. The system of claim 2, wherein creating a run-time model based on the run-time time series and selecting a training model from the dynamic behavior model data store that matches the run-time model comprises:

creating a run-time spectrogram of the run-time time series;
applying an SVD to the run-time spectrogram;
creating an LRA of the SVD of the run-time spectrogram to create the run-time model; and
comparing the run-time model to training models in the dynamic behavior model data store to select a matching training model.

8. The system of claim 7, wherein comparing the run-time model to training models in the dynamic behavior model data store includes using an L1 norm library search.

9. The system of claim 1, further comprising an objective function measurement device that includes:
an optical spectrum analyzer device configured to provide measurements of a spectrum and a power content of a mode-locked pulse; and
an objective function calculation engine configured to calculate an objective function value based on the spectrum measurement and the power content measurement.

10. The system of claim 9, wherein the objective function calculation engine is configured to calculate the objective function value by dividing an energy (E) of the output of the mode-locked laser by a kurtosis ($\kappa$) of a Fourier spectrum of a waveform of the output of the mode-locked laser.

11. The system of claim 1, wherein the optimization controller device further includes at least one extremum-seeking controller device, and wherein the at least one extremum-seeking controller device comprises:
an extremum-seeking servo controller engine coupled to one of the servos of the set of servos and configured to use the servo to control an angular position of its associated optical element; and
an extremum-seeking controller engine configured to:
instruct the extremum-seeking servo controller engine to perturb the angular position of its associated optical element in a sinusoidal manner around an estimated optimal angular position based on a perturbation signal;
receive a sinusoidal signal from the objective function measurement device indicating a change in the objective function over time;
apply a high-pass filter to the sinusoidal signal to create a filtered signal;
multiply the filtered signal by the perturbation signal to create a demodulated signal; and
integrating the demodulated signal into the estimated optimal angular position to generate a new estimated optimal angular position.

12. An automated method of tuning a mode-locked laser at run-time, wherein the mode-locked laser includes a set of optical elements, and wherein each optical element of the set of optical elements has a position setting, the method comprising:
obtaining a time series of objective function value measurements while performing a sampling of the position settings of the optical elements;
creating a model based on the time series;
comparing the model to a plurality of models stored in a dynamic behavior model data store to find a matching model; and
setting the position settings of the optical elements to match optimal position settings associated with the matching model;
wherein performing the sampling of the position settings of the optical elements includes performing a toroidal search by using servos to rotate the optical elements at incommensurate rates.

13. The method of claim 12, wherein creating the model based on the time series includes:
creating a spectrogram of the time series using a wavelet transform;
applying a singular value decomposition (SVD) to the spectrogram; and
creating a low-rank approximation (LRA) of the SVD.

14. The method of claim 13, wherein the wavelet transform is a Gabor transform.

15. The method of claim 13, wherein comparing the model to the plurality of models stored in the dynamic behavior model data store to find a matching model includes performing an L1 norm library search using the LRA of the SVD.

16. The method of claim 12, further comprising:
using an extremum-seeking controller to update the position settings of the optical elements after setting the position settings of the optical elements to the optimal position settings.

17. An automated method of creating a library of dynamic behavior models for tuning a mode-locked laser, wherein the mode-locked laser includes a set of optical elements, and wherein each optical element of the set of optical elements has a position setting, the method comprising:
for a plurality of different environmental conditions:
obtaining a time series of objective function value measurements while performing a sampling of the position settings of the optical elements;
creating a model based on the time series; and
storing the model in association with a corresponding set of optimal position settings in a dynamic behavior model data store;
wherein performing the sampling of the position settings includes performing a toroidal search of the angular positions of the optical elements by using servos to rotate the optical elements at incommensurate rates.

18. The method of claim 17, wherein creating the model based on the time series includes:
creating a spectrogram of the time series using a Gabor transform;
applying a singular value decomposition (SVD) to the spectrogram; and
creating a low-rank approximation (LRA) of the SVD.

19. The method of claim 18, wherein storing the model in association with a corresponding set of optimal position settings in the dynamic behavior model data store includes:
storing the LRA in the dynamic behavior model data store;
determining a set of optimal position settings by finding position settings associated with a point in the time series for which the objective function had a greatest value; and
storing the determined set of optimal position settings in association with the LRA.

20. The method of claim 17, further comprising altering at least one environmental condition to generate the plurality of different environmental conditions.

21. The method of claim 20, wherein the at least one environmental condition includes an ambient temperature or a force applied to a component of the mode-locked laser.

* * * * *